United States Patent
Chai

(10) Patent No.: US 12,245,112 B2
(45) Date of Patent: Mar. 4, 2025

(54) METHOD FOR PERFORMING CHARGING PROCESSING ON GUARANTEED DATA SERVICE, SYSTEM, AND RELATED DEVICE

(71) Applicant: HUAWEI TECHNOLOGIES CO., LTD., Guangdong (CN)

(72) Inventor: Xiaoqian Chai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 474 days.

(21) Appl. No.: 17/668,578

(22) Filed: Feb. 10, 2022

(65) Prior Publication Data
US 2022/0272503 A1   Aug. 25, 2022

Related U.S. Application Data

(63) Continuation of application No. PCT/CN2020/108115, filed on Aug. 10, 2020.

(30) Foreign Application Priority Data

Aug. 11, 2019   (CN) .......................... 201910737105.8

(51) Int. Cl.
*H04W 4/24*   (2024.01)
*H04W 24/08*   (2009.01)
*H04W 28/02*   (2009.01)

(52) U.S. Cl.
CPC ............. *H04W 4/24* (2013.01); *H04W 24/08* (2013.01); *H04W 28/0268* (2013.01)

(58) Field of Classification Search
CPC ...... H04W 4/24; H04W 4/08; H04W 28/0268
(Continued)

(56) References Cited

U.S. PATENT DOCUMENTS 8,259,623 B2 * 9/2012 Momtahan ............ H04L 47/785
709/227
11,044,664 B2 * 6/2021 Cai ......................... H04W 8/24
(Continued)

FOREIGN PATENT DOCUMENTS

| CN | 1809107 A | 7/2006 |
| CN | 1848741 A | 10/2006 |

(Continued)

OTHER PUBLICATIONS

3GPP TS 32.255 V16.1.0 (Jun. 2019)3rd Generation Partnership Project; Technical Specification Group Services and System Aspects;Telecommunication management; Charging management;5G data connectivity domain charging; stage 2(Release 16), Total 72 Pages.

(Continued)

*Primary Examiner* — Mong-Thuy T Tran

(57) ABSTRACT

A charging processing method is provided and includes: obtaining QoS of a guaranteed data service of a user and a guarantee status of the QoS, performing charging processing on charging data of the guaranteed data service based on the information, when the guarantee status of the QoS changes or a guarantee notification switch status of the QoS changes, disabling a counter in a timely manner, and separately processing charging data that exists before the change and charging data that exists after the change. In this way, an operator can accurately perform charging on the guaranteed data service "based on the guarantee status", to improve user experience. In addition, the operator can obtain revenue corresponding to occupied network resources.

20 Claims, 13 Drawing Sheets

(58) Field of Classification Search
USPC .......................................................... 455/406
See application file for complete search history.

(56) References Cited

U.S. PATENT DOCUMENTS

| | | | | |
|---|---|---|---|---|
| 11,190,427 | B2* | 11/2021 | Raleigh | H04L 47/19 |
| 11,343,111 | B2* | 5/2022 | Wang | H04M 15/65 |
| 11,349,997 | B2* | 5/2022 | Cai | H04W 4/24 |
| 2015/0081843 | A1* | 3/2015 | Momtahan | H04L 67/60 |
| | | | | 709/217 |
| 2017/0332312 | A1* | 11/2017 | Jung | H04W 60/00 |
| 2018/0007586 | A1* | 1/2018 | Wang | H04M 15/00 |
| 2019/0053104 | A1* | 2/2019 | Qiao | H04W 28/24 |
| 2019/0182838 | A1* | 6/2019 | Bondarenko | H04M 15/7652 |
| 2019/0327624 | A1* | 10/2019 | Raleigh | H04W 52/0264 |
| 2019/0394830 | A1* | 12/2019 | Mildh | H04W 52/0258 |
| 2020/0068446 | A1* | 2/2020 | Nimbavikar | H04L 67/306 |

FOREIGN PATENT DOCUMENTS

| | | | | |
|---|---|---|---|---|
| CN | 101141266 A | 3/2008 | | |
| CN | 102572760 A | 7/2012 | | |
| CN | 104468135 A | 3/2015 | | |
| CN | 105812149 A | 7/2016 | | |
| EP | 4307643 A2 * | 1/2024 | | H04L 67/30 |
| WO | 2010049002 A1 | 5/2010 | | |
| WO | 2019137524 A1 | 7/2019 | | |

OTHER PUBLICATIONS

3GPP TS 29.512 V16.1.0 (Jun. 2019)3rd Generation Partnership Project; Technical Specification Group Core Network and Terminals; 5G System; Session Management Policy Control Service;Stage 3(Release 16), total 157 pages.

3GPP TS 32.290 V16.1.0 (Jun. 2019)3rd Generation Partnership Project; Technical Specification Group Services and System Aspects; Telecommunication management; Charging management; 5G system; Services, operations and procedures of charging using Service Based Interface (SBI) (Release 16), Total 29 Pages.

3GPP TS 32.291 V16.0.0 (Jun. 2019)3rd Generation Partnership Project; Technical Specification Group Services and System Aspects; Telecommunication management; Charging management; 5G system, charging service; Stage 3 (Release 16), total 89 pages.

NEC, "Further discussion on Notification Control and QoS Flows", 3GPP TSG-RAN WG3#99-Bis R3-182020,Sanya, China, Apr. 16-20, 2018, Total 3 Pages.

* cited by examiner

METHOD FOR PERFORMING CHARGING PROCESSING ON GUARANTEED DATA SERVICE, SYSTEM, AND RELATED DEVICE

CROSS-REFERENCE TO RELATED APPLICATIONS

This disclosure is a continuation of International Application No. PCT/CN2020/108115, filed on Aug. 10, 2020, which claims priority to Chinese Patent Application No. 201910737105.8, filed on Aug. 11, 2019. The disclosures of the aforementioned applications are hereby incorporated by reference in their entireties.

TECHNICAL FIELD

This disclosure relates to the communications field, and in particular, to a method for performing charging processing on a guaranteed data service of a user, a system, and a related device.

BACKGROUND

As a yield per bit is to decline continuously, a new charging dimension emerges with wide applications of high-bandwidth and low-latency applications in 5G (5th Generation Mobile Network). A feature of a 5G network is that a quality of service (QoS) guarantee can be provided for a large quantity of services. However, according to the existing 3GPP (3rd Generation Partnership Project) standard specification, for a data service whose QoS is to be guaranteed, a charging function (CHF) device performs charging only based on authorized QoS. This leads to a problem that if the CHF device performs charging based on QoS that is to be guaranteed, but a radio access network (RAN) actually fails to reserve network resources corresponding to the authorized QoS, a loss of a user is caused, and user experience is reduced. However, if the CHF device performs charging based on QoS that is not to be guaranteed, but an operator actually reserves valuable network resources for QoS that is to be guaranteed, a loss of the operator is caused.

SUMMARY

In view of this, it is necessary to provide a method for performing charging processing on a guaranteed data service of a user, to perform charging processing on the guaranteed data service based on a guarantee status of QoS.

According to a first aspect, the embodiments of this disclosure provide a charging system, where the charging system includes a charging trigger device and a charging processing device.

The charging trigger device is configured to obtain charging data of a guaranteed data service, a quality of service QoS that is of the guaranteed data service and that corresponds to the charging data, and a guarantee status GS of the QoS; send a charging request message to the charging processing device, where the charging request message includes the charging data, the QoS, and the GS; and receive a charging response message from the charging processing device, where the charging response message includes a charging processing result of the charging request message.

The charging processing device is configured to receive the charging request message from the charging trigger device, perform charging processing based on the charging request message, and send the charging response message to the charging trigger device.

In the charging system, the charging trigger device can obtain charging information including the guarantee status of the QoS, and send the charging information to the charging processing device. The charging processing device may perform charging processing on the guaranteed data service based on the guarantee status of the QoS, so that an operator can perform charging on the guaranteed data service "based on the guarantee status". This can improve user experience and also help the operator obtain revenue corresponding to occupied network resources.

In a possible solution, the charging data includes usage data of the guaranteed data service and/or a requested quota of the guaranteed data service.

In a possible solution, the charging trigger device is specifically configured to set a guarantee status trigger of the QoS, where a reporting type of the guarantee status trigger is set to immediate reporting or deferred reporting.

In a possible solution, the charging trigger device is specifically configured to set a guarantee notification switch status trigger of the QoS, where a reporting type of the guarantee notification switch status trigger is set to immediate reporting or deferred reporting.

In a possible solution, that the charging processing device is configured to perform charging processing based on the charging request message is specifically: The charging processing device is configured to perform charging processing on the charging data based on the QoS and the GS.

In a possible solution, the charging trigger device is further configured to obtain a guarantee notification switch status of the QoS, and include the guarantee notification switch status of the QoS in the charging request message; and the charging processing device is further configured to perform charging processing on the charging data based on the QoS, the GS, and the guarantee notification switch status.

In a possible solution, the charging processing device is further configured to include one or more of the following operation instructions in the charging response message: an operation instruction of a guarantee notification switch of the QoS, an operation instruction of a guarantee status trigger of the QoS, and an operation instruction of a guarantee notification switch status trigger of the QoS; and the charging trigger device is further configured to execute the one or more operation instructions.

According to a second aspect, the embodiments of this disclosure provide a method for performing charging processing on a guaranteed data service of a user. The method is performed by a charging trigger device, and includes: obtaining charging data of the guaranteed data service, a quality of service QoS that is of the guaranteed data service and that corresponds to the charging data, and a guarantee status GS of the QoS; sending a charging request message to a charging processing device, where the charging request message includes the charging data, the QoS, and the GS; and receiving a charging response message from the charging processing device, where the charging response message includes a charging processing result of the charging request message.

In a possible solution, the charging data includes usage data of the guaranteed data service and/or a requested quota of the guaranteed data service.

In the foregoing possible solution, the charging trigger device can obtain the charging data and the corresponding guarantee status of the QoS of the guaranteed data service, so that the charging processing device can perform charging on online charging or offline charging guaranteed data service "based on the guarantee status".

In a possible solution, the charging processing device may locally activate a guarantee status trigger of the QoS. Specifically, before the sending a charging request message to a charging processing device, the method further includes: setting the guarantee status trigger of the QoS, where a reporting type of the guarantee status trigger is set to immediate reporting, and the guarantee status trigger causes the charging trigger device to send, to the charging processing device when the guarantee status of the QoS changes, usage data that is of the guaranteed data service and that exists before the change; or a reporting type of the guarantee status trigger is deferred reporting, and the guarantee status trigger causes the charging trigger device to store, when the guarantee status of the QoS changes, usage data that is of the guaranteed data service and that exists before the change, and then report the stored usage data by having the stored usage data carried in the charging request message that is sent to the charging processing device after the change.

In a possible solution, the charging trigger device may set a guarantee status trigger under management by the charging processing device, specifically receive an operation instruction of the guarantee status trigger from the charging processing device, and set a reporting type of the guarantee status trigger and/or set an activation status of the guarantee status trigger based on the operation instruction of the guarantee status trigger.

In a possible solution, the charging processing device receives the operation instruction of the guarantee status trigger by using the charging response message, and sets the reporting type of the guarantee status trigger and/or sets the activation status of the guarantee status trigger based on the operation instruction of the guarantee status trigger.

In a possible solution, the charging trigger device immediately reports the usage data that exists before the guarantee status changes. Specifically, the reporting type of the guarantee status trigger is set to immediate reporting, and the method further includes: determining that the guarantee status of the QoS changes from a first guarantee status to a second guarantee status. The obtaining the charging data is specifically: obtaining first usage data of the guaranteed data service in the first guarantee status. The sending a charging request message to a charging processing device is specifically: sending the charging request message to the charging processing device, where the GS in the charging request message is the first guarantee status, the charging data in the charging request message is the first usage data, the charging request message further includes a reporting reason of the first usage data, and the reporting reason indicates that the first usage data is sent to the charging processing device because the guarantee status of the QoS changes.

In a possible solution, the charging trigger device defers reporting of the usage data that exists before the guarantee status changes. Specifically, the reporting type of the guarantee status trigger is deferred reporting, and the method further includes: determining that the guarantee status of the QoS changes from a first guarantee status to a second guarantee status; and storing first usage data of the guaranteed data service in the first guarantee status, the first guarantee status, and a disabling reason of a counter of the first usage data, where the disabling reason of the counter indicates that the counter is disabled because the guarantee status of the QoS changes. The obtaining the charging data and the GS, and the sending the charging request message to the charging processing device are specifically: when a charging reporting condition is met, obtaining the stored first usage data and the stored first guarantee status, and sending the charging request message to the charging processing device, where the charging data in the charging request message is the first usage data, the GS in the charging request message is the first guarantee status, the charging request message further includes the disabling reason of the counter of the first usage data, and the disabling reason indicates that the counter of the first usage data is disabled because the guarantee status of the QoS changes.

In a possible solution, the method further includes: collecting second usage data of the guaranteed data service in the second guarantee status, where the charging request message further includes the second usage data and the second guarantee status.

In the foregoing possible solution, the charging processing device can still perform charging "based on the guarantee status" when the guarantee status of the QoS changes, to avoid a charging error. An immediate reporting mechanism can cause the change of the guarantee status to be reflected in a charging processing result in a more timely manner, to help to improve user experience. A deferred reporting mechanism can reduce interactions between the charging trigger device and the charging processing device, and reduce pressure on a gateway and the charging processing device.

In a possible solution, the charging trigger device may locally activate a guarantee notification switch status trigger. Specifically, before the sending a charging request message to a charging processing device, the method further includes: setting the guarantee notification switch status trigger of the QoS, where a reporting type of the guarantee notification switch status trigger is set to immediate reporting, and the guarantee notification switch status trigger causes the charging trigger device to send, to the charging processing device when a guarantee notification switch status changes, usage data that is of the guaranteed data service and that exists before the change; or a reporting type of the guarantee notification switch status trigger is deferred reporting, and the guarantee notification switch status trigger causes the charging trigger device to store, when a guarantee notification switch status changes, usage data that is of the guaranteed data service and that exists before the change, and then report the stored usage data by having the stored usage data carried in the charging request message that is sent to the charging processing device after the change.

In a possible solution, the charging trigger device may set a guarantee notification switch status trigger under management by the charging processing device, and specifically, the method further includes: receiving an operation instruction of the guarantee notification switch status trigger from the charging processing device, and setting a reporting type of the guarantee notification switch status trigger and/or setting an activation status of the guarantee notification switch status trigger based on the operation instruction of the guarantee notification switch status trigger.

In a possible solution, the charging trigger device receives the operation instruction of the guarantee notification switch status trigger by using the charging response message.

In a possible solution, the charging trigger device immediately reports the usage data that exists before the guarantee notification switch status changes. Specifically, the reporting type of the guarantee notification switch status trigger is set to immediate reporting, and the method further includes: determining that a guarantee notification switch status of the QoS changes from a first switch status to a second switch status. The obtaining the charging data is specifically: obtaining first usage data of the guaranteed data service under the first switch status. The sending a charging request message to a charging processing device is specifically:

sending the charging request message to the charging processing device, where the charging data in the charging request message is the first usage data, the charging request message further includes the first switch status and a reporting reason of the first usage data, and the reporting reason indicates that the first usage data is sent to the charging processing device because the guarantee notification switch status of the QoS changes.

In a possible solution, the charging trigger device defers reporting of the usage data that exists before the guarantee notification switch status changes. Specifically, the reporting type of the guarantee notification switch status trigger is deferred reporting, and the method further includes: determining that the guarantee notification switch status of the QoS changes from a first switch status to a second switch status; and storing first usage data of the guaranteed data service under the first switch status, the first switch status, and a disabling reason of a counter of the first usage data, where the disabling reason of the counter indicates that the counter is disabled because the guarantee notification switch status of the QoS changes. The obtaining the charging data, and the sending the charging request message to the charging processing device are specifically: when a charging reporting condition is met, obtaining the stored first usage data, and sending the charging request message to the charging processing device, where the charging data in the charging request message is the first usage data, the charging request message further includes the first switch status and the disabling reason of the counter of the first usage data.

In a possible solution, the charging trigger device collects second usage data of the guaranteed data service in the second switch status, where the charging request message further includes the second usage data and the second switch status.

In a possible solution, the charging trigger device further sends the guarantee notification switch status of the QoS to the charging processing device.

In the foregoing possible solution, the charging processing device can still perform charging "based on the guarantee status" when the guarantee notification switch status of the QoS changes, to avoid a charging error.

In a possible solution, the charging trigger device sends the guarantee notification switch status of the QoS to the charging processing device by using the charging request message.

In a possible solution, the charging trigger device further receives an operation instruction of the guarantee notification switch of the QoS from the charging processing device; and if the operation instruction of the guarantee notification switch instructs to turn on the guarantee notification switch and a current status of the guarantee notification switch is off, the charging trigger device requests a radio access network to notify the charging trigger device of the guarantee status of the QoS; or if the operation instruction of the guarantee notification switch instructs to turn off the guarantee notification switch and the guarantee notification switch can be turned off currently, the charging trigger device requests a radio access network to cancel notifying the charging trigger device of the guarantee status of the QoS.

In a possible solution, the charging trigger device further obtains an operation instruction of the guarantee notification switch of the QoS by using the charging request message, and the method further includes: if the operation instruction of the guarantee notification switch instructs to turn on the guarantee notification switch, requesting a radio access network to notify the charging trigger device of the guarantee status of the QoS; or if the operation instruction of the guarantee notification switch instructs to turn off the guarantee notification switch, requesting the radio access network to cancel notifying the charging trigger device of the guarantee status of the QoS.

In a possible solution, the charging trigger device further sends a 5G QoS identifier 5QI of the guaranteed data service or a resource type of the guaranteed data service to the charging processing device.

In a possible solution, the charging trigger device sends the 5G QoS identifier 5QI of the guaranteed data service or the resource type of the guaranteed data service to the charging processing device by using the charging request message.

According to a third aspect, the embodiments of this disclosure provide a method for performing charging processing on a guaranteed data service of a user, performed by a charging processing device. The method includes: receiving a charging request message from a charging trigger device, where the charging request message includes charging data of the guaranteed data service, a quality of service QoS that is of the guaranteed data service and that corresponds to the charging data, and a guarantee status GS of the QoS; performing charging processing based on the charging request message; and sending a charging response message to the charging trigger device, where the charging response message includes a charging processing result of the charging request message.

In a possible solution, the charging data includes usage data of the guaranteed data service and/or a requested quota of the guaranteed data service.

In a possible solution, the charging request message further includes a 5G QoS identifier 5QI of the guaranteed data service or a resource type of the guaranteed data service, and the charging processing includes: determining, based on the 5QI or the resource type, that a quality of service of the guaranteed data service is to be guaranteed.

In a possible solution, the charging request message includes a guarantee notification switch status of the QoS, and the charging processing includes: performing charging processing based on the guarantee notification switch status.

In a possible solution, the charging processing includes: performing charging processing based on the charging data, the QoS, and the GS.

In a possible solution, the charging processing includes: determining that a reporting type of a guarantee status trigger of the QoS and/or an activation status of the guarantee status trigger of the QoS are/is to be set; and sending an operation instruction of the guarantee status trigger of the QoS to the charging trigger device, where the operation instruction instructs the charging trigger device to set the reporting type of the guarantee status trigger and/or the activation status of the guarantee status trigger.

In a possible solution, the charging processing includes: determining that a reporting type of a guarantee notification switch status trigger of the QoS and/or an activation status of the guarantee notification switch status trigger of the QoS are/is to be set; and sending an operation instruction of the guarantee notification switch status trigger of the QoS to the charging trigger device, where the operation instruction instructs the charging trigger device to set the reporting type of the guarantee notification switch status trigger and/or the activation status of the guarantee notification switch status trigger.

In a possible solution, the performing charging processing based on the guarantee notification switch status specifically includes: when the guarantee notification switch status of the QoS is turned off, including an operation instruction of a guarantee notification switch to the charging response message, where the operation instruction instructs the charging trigger device to turn on the guarantee notification switch, or determining to perform, as the guarantee status of the QoS is a non-guaranteed status, charging processing on the charging data that is of the guaranteed data service and that is received after the charging request message is received.

In the foregoing possible solution, the charging processing device may perform charging processing based on the charging data reported by the charging trigger device and the corresponding guarantee status of the QoS, to perform charging on the guaranteed data service "based on the guarantee status". In addition, the charging processing device may initiate a management operation on the guarantee status trigger, the guarantee notification switch status trigger, and the like on the charging trigger device, to implement more flexible charging processing.

According to a fourth aspect, the embodiments of this disclosure provide a charging trigger device, including a processor and a memory. The memory is configured to store program instructions. The processor is configured to invoke and execute the program instructions stored in the memory, so that the charging trigger device performs the method for performing charging processing on a guaranteed data service of a user in the second aspect.

According to a fifth aspect, the embodiments of this disclosure provide a computer-readable storage medium, including instructions. When the instructions are run on a computer, the computer is enabled to perform the method for performing charging processing on a guaranteed data service of a user in the second aspect.

According to a sixth aspect, the embodiments of this disclosure provide a charging processing device, including a processor and a memory. The memory is configured to store program instructions. The processor is configured to invoke and execute the program instructions stored in the memory, so that the charging processing device performs the method for performing charging processing on a guaranteed data service of a user in the third aspect.

According to a seventh aspect, the embodiments of this disclosure provide a computer-readable storage medium, including instructions. When the instructions are run on a computer, the computer is enabled to perform the method for performing charging processing on a guaranteed data service of a user in the third aspect.

According to an eighth aspect, an embodiment of this disclosure provides a chip. The chip includes a programmable logic circuit and/or a program instruction, and when being running, the chip is configured to implement the method in the second aspect or any possible implementation of the second aspect, or the method in the third aspect or any possible implementation of the third aspect.

DESCRIPTION OF EMBODIMENTS

The following describes the technical solutions in the embodiments of this disclosure with reference to the accompanying drawings in the embodiments of this disclosure. In the descriptions of this disclosure, "/" represents an "or" relationship between associated objects unless otherwise specified. For example, A/B may represent A or B. The term "and/or" in this disclosure indicates an association relationship for describing associated objects and indicates that three relationships may exist. For example, A and/or B may indicate the following three cases: Only A exists, both A and B exist, and only B exists, where A and B may be singular or plural. In addition, in the descriptions of this disclosure, "a plurality of" means two or more than two. "At least one item (piece) of the following" or a similar expression thereof means any combination of these items, including a singular item (piece) or any combination of plural items (pieces). For example, at least one of a, b, or c may represent a, b, c, a combination of a and b, a combination of a and c, a combination of b and c, or a combination of a, b, and c, where a, b, and c may be in a singular or plural form. In addition, for convenience of clear description of the technical solutions in the embodiments of this disclosure, in the embodiments of this disclosure, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

Figure 1:
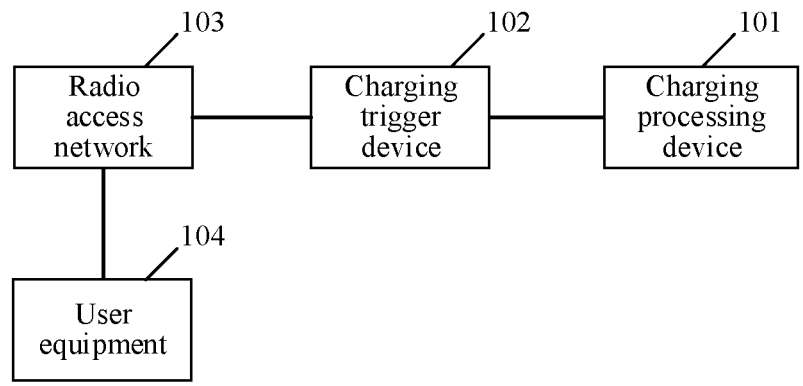
FIG. 1 is an architectural diagram of a charging system according to an embodiment of this disclosure.

FIG. 1 is an architectural diagram of a charging system according to an embodiment of this disclosure. The charging system includes at least a charging processing device 101, a charging trigger device 102, a radio access network 103, user equipment 104, and the like. Main functions of these devices are separately described as follows:

The charging processing device 101 may be configured to: receive a charging request message from the charging trigger device 102; perform charging processing on charging data in the charging request message based on a guarantee status of QoS and QoS that is to be guaranteed (that is, the guaranteed QoS authorized by a policy control device) that are carried in the charging request message; for example, if the charging data includes usage data, the charging processing device 101 writes the usage data, the corresponding QoS that is to be guaranteed, and the corresponding guarantee status of the QoS into a charging data record, or performs rating based on the QoS that is to be guaranteed and the guarantee status of the QoS (that is, the QoS and the guarantee status of the QoS are used as rating factors), and performs deduction processing on a user account. For details, refer to method procedures corresponding to FIG. 1, FIG. 3A, and FIG. 3B in subsequent embodiments of this disclosure. The user account in the embodiments of this disclosure is a charging account of a user, and details are not described. The charging processing device 101 may be further configured to deliver a management instruction related to a guarantee status to the charging trigger device.

In the embodiments of this disclosure, the charging processing device may be a CHF (Charging Function) device defined in the 3GPP standard specification, or may be a CCS (Converged Charging System) device defined in the 3GPP standard specification, and includes a function of a CHF device. For ease of description, in the embodiments of this disclosure, the charging processing device is sometimes directly referred to as the CHF device.

The charging trigger device 102 is mainly responsible for obtaining charging data of a guaranteed data service of a user, a guarantee status of QoS, and information about QoS that is to be guaranteed; sending the charging data to the charging processing device 101 when a charging reporting condition is met; further receiving, from the charging processing device 101, a management instruction related to the guaranteed data service, for example, an operation instruction of a guarantee status trigger, an operation instruction of a guarantee notification switch, and the like; and executing the management instruction.

For ease of understanding, some concepts in the embodiments of this disclosure are explained as follows:

A data service is a quality of service flow (QoS Flow) or one or more service data flows (SDF) accessed or used by user equipment (for example, the user equipment 104) of a user. In the charging trigger device and the charging request message reported to the charging processing device, a QFI (QoS Flow Identifier) may be used to identify a data service, or an RG (Rating Group) may be used to identify a data service, or a combination of an RG and a service identifier may also be used to identify a data service.

A guaranteed data service is a data service for which guarantee of a quality of service is required by the policy control device.

Quality of service (QoS) of a guaranteed data service is QoS that is to be guaranteed for the guaranteed data service, and includes one or more QoS parameters, for example, "a guaranteed bandwidth is 100 M", "a latency is 10 ms", and "a maximum bandwidth is 500 M". The charging trigger device may obtain the QoS of the guaranteed data service from a PCC rule (Policy and Charging Control Rule) delivered or activated by the policy control device. For ease of description, QoS of a guaranteed data service is sometimes referred to as QoS that is to be guaranteed, or the like. It should be understood that, in the embodiments of this disclosure, when "QoS" does not have an attribute, the "QoS" may be understood as QoS of a guaranteed data service described in the context.

A guarantee status (GS) of QoS is a status of whether QoS of a guaranteed data service can be guaranteed. For example, if the radio access network allocates, to the guaranteed data service, network resources that meet the required QoS, the guarantee status of the QoS is "guaranteed". Conversely, if the radio access network does not allocate, to the guaranteed data service, network resources that meet the required QoS, the guarantee status of the QoS is "non-guaranteed". The guarantee status of the QoS corresponds to the QoS. When the QoS of the guaranteed data service changes, the QoS that exists before the change and the QoS that exists after the change may have respective guarantee statuses.

A guarantee status trigger of QoS is a detection item set for the charging trigger device. After the guarantee status trigger is activated or set to a status of "activated" or "valid", the charging trigger device may be caused to detect an occurrence of the detection item, that is, detect a change in a guarantee status of QoS of a guaranteed data service. In addition, after detecting the change, the charging trigger device may be caused to adapt to the change to collect usage data of the guaranteed data service and/or manage a quota of the guaranteed data service, for example, differentiate, based on different guarantee statuses, usage data of the guaranteed data service and/or a requested quota of the guaranteed data service that exists before the change and usage data of the guaranteed data service and/or a requested quota of the guaranteed data service that exists after the change, and report, to the charging processing device, the usage data and/or the requested quotas differentiated based on the guarantee statuses.

If a reporting type of the guarantee status trigger is set to immediate reporting, the trigger may cause the charging trigger device to: when the guarantee status of the QoS of the guaranteed data service changes, disable a counter of the guaranteed data service, obtain usage data that is of the guaranteed data service and that exists before the change, and send a charging request message to the charging processing device. The charging request message includes the usage data and the guarantee status that is of the QoS and that exists before the change. Optionally, if a charging mode of the guaranteed data service is online charging, the charging request message may further include the requested quota that exists after the change and the guarantee status that is of the QoS and that exists after the change.

If a reporting type of the guarantee status trigger is set to deferred reporting, the trigger may cause the charging trigger device to: when the guarantee status of the QoS changes, disable the counter of the guaranteed data service, obtain and store usage data that is of the guaranteed data service and that exists before the change and the guarantee status that exists before the change, and send, to the charging processing device after the change, the first charging request message that carries or includes the stored usage data and the corresponding guarantee status of the QoS. Optionally, the charging trigger device may further obtain usage data that is of the guaranteed data service and that exists between a time point at the change occurs and a time point at which a first charging reporting condition after the change is met, and use the first charging request message sent after the change to carry or include the usage data and the guarantee status that is of the QoS and that exists after the change.

After the trigger is deactivated or set to a status of "invalid", the charging trigger device may be enabled to ignore or skip detecting the detection item, or perform no action after detecting the detection item.

A QoS guarantee notification switch (GNS) is used to indicate whether the charging trigger device requests the radio access network to notify a guarantee status of QoS of a guaranteed data service.

A guarantee notification switch status (GNSS) of QoS is a guarantee notification switch status of QoS of a guaranteed data service. For example, if the radio access network is requested to notify a guarantee status of the QoS of the guaranteed data service, the status is "on". If the radio access network is not requested to notify a guarantee status of the QoS of the guaranteed data service, the status is "off".

A guarantee notification switch status trigger of QoS is a detection item set for the charging trigger device. After the guarantee notification switch status trigger is activated or set to a status of "activated" or "valid", the charging trigger device may be caused to detect an occurrence of the detection item, that is, detect a change in a guarantee notification switch status of QoS of a guaranteed data service. In addition, after detecting the change, the charging trigger device is caused to adapt to the change to collect usage data of the guaranteed data service and/or manage a quota of the guaranteed data service, for example, differentiate, based on different guarantee notification switch statuses, usage data of the guaranteed data service and/or a requested quota of the guaranteed data service that exist/exists before the change and usage data of the guaranteed data service and/or a requested quota of the guaranteed data service that exist/exists after the change, and report, to the charging processing device, the usage data and/or the requested quotas differentiated based on the guarantee notification switch statuses.

If a reporting type of the guarantee notification switch status trigger is set to immediate reporting, the trigger may cause the charging trigger device to: when the guarantee notification switch status of the QoS changes, send a charging request message to the charging processing device. The charging request message includes usage data that is of the guaranteed data service and that exists before the change, a guarantee status that is of the QoS and that exists before the change, and the guarantee notification switch status that is of the QoS and that exists before the change. Optionally, if a charging mode of the guaranteed data service is online charging, the charging request message may further include the requested quota that exists after the change, a guarantee status that is of the QoS and that exists after the change, and the guarantee notification switch status that is of the QoS and that exists after the change.

If a reporting type of the guarantee notification switch status trigger is set to deferred reporting, the trigger may cause the charging trigger device to: when the guarantee status of the QoS changes, disable a counter of the guaranteed data service, obtain and store usage data that is of the guaranteed data service and that exists before the change, a guarantee status that is of the QoS and that exists before the change, and the guarantee notification switch status that is of the QoS that exists before the change, and send, to the charging processing device after the change, the first charging request message that carries the stored usage data, the stored corresponding guarantee status of the QoS, and the stored guarantee notification switch status of the QoS. Optionally, the charging trigger device may further obtain usage data that exists between a time point at which the change occurs and a time point at which a first charging reporting condition after the change is met, and include, in the first charging request message sent after the change, the usage data, a guarantee status that is of the QoS and that exists after the change, and the guarantee notification switch status that is of the QoS and that exists after the change.

After the trigger is deactivated or set to a status of "invalid", the charging trigger device may be caused to ignore or skip detecting the detection item, or perform no action after detecting the detection item.

Usage data includes usage of a guaranteed data service, for example, traffic or duration, and is provided for the charging processing device (for example, the charging processing device 101) to perform charging processing for a user corresponding to user equipment that accesses or uses the guaranteed data service. The usage data may include information such as uplink data traffic, downlink data traffic, or duration. In the embodiments of this disclosure, the usage data may have corresponding QoS, a corresponding guarantee status of the QoS, or a corresponding guarantee notification switch status of the QoS, and these are QoS, a guarantee status of the QoS, and a guarantee notification switch status of the QoS that are of the guaranteed data service in a process of generating the usage data.

Charging data is data obtained by the charging trigger device for charging processing in a process in which the user equipment uses a guaranteed data service, and may include usage data of the guaranteed data service (for example, a used unit defined in the 3GPP standard specification) and/or a requested service unit quota of a user service (for example, a requested unit defined in the 3GPP standard specification), and other information that is of the user service and that may be used for charging processing. A service unit quota is a limit for which the charging trigger device (for example, the charging trigger device 102) applies to a charging processing device (for example, the charging processing device 101) and that is used for controlling access or use of the guaranteed data service. For example, the service unit quota may be traffic (for example, 5 M), and the quota indicates that the charging trigger device may allow the user equipment to use a maximum of 5 M data traffic. For ease of description, in the embodiments of this disclosure, the "service unit quota" is sometimes directly referred to as a "quota", and the "amount of requested service unit quota" is briefly referred to as a "requested quota".

A charging request message is a request message sent by the charging trigger device to the charging processing device, so that the charging processing device performs charging processing on a data service of a user. The charging request message carries information, such as charging data, used for charging processing. In the embodiments of this disclosure, the charging request message may further carry QoS corresponding to the charging data, a guarantee status of the QoS, a guarantee notification switch status of the QoS, or the like.

The charging trigger device in the embodiments of this disclosure may be a CTF (Charging Trigger Function) device defined in the 3GPP standard specification. For ease of description, in the embodiments of this disclosure, alternatively, the charging trigger device is sometimes directly referred to as a CTF device.

When the guaranteed data service is a 5G data connection service, a function of the charging trigger device may be deployed in an SMF (Session Management Function) device defined in the 3GPP specification. A physical device in which the function of the charging trigger device is deployed is not limited in the embodiments of this disclosure.

It should be understood that, during actual deployment, the charging system shown in FIG. 1 may have more charging trigger devices.

The radio access network 103 provides an access service for user equipment (for example, the user equipment 104) of a terminal user, so that the user equipment can access a data service. According to different policies of operators, in a process of providing an access service for the user equipment, the radio access network 103 may guarantee a quality of service of the data service of the user, for example, guarantee that a minimum guaranteed bandwidth of the user equipment is 10 Mbps. However, because network resources are limited, sometimes, the radio access network may not reserve sufficient network resources for a guaranteed service. To facilitate charging processing, the radio access network 103 may send a guarantee status of the quality of service of the data service to a charging trigger device (for example, the charging trigger device 102). The radio access network 103 may further receive a request message sent by the charging trigger device, and determine, by using the request message, whether to notify the guarantee status of the QoS of the data service to the charging trigger device or no longer to notify the guarantee status of the QoS to the charging trigger device. The radio access network 103 may include a base station, and the base station exchanges messages with the charging trigger device, for example, transfer the guarantee status of the QoS.

The user equipment 104 is a device of a terminal user, for example, a mobile phone, a notebook computer, a shared bicycle terminal, or a water/electricity/gas meter reading terminal. The charging trigger device 102 performs an online charging operation or an offline charging operation on a service used or accessed by the user equipment 104, and collects charging data. The offline charging operation is directly collecting or collecting statistics on usage of a user service, without controlling allow of the service based on a quota. The online charging operation is controlling allow of a service based on a quota, and collecting or collecting statistics on usage.

The embodiments of this disclosure are mainly described by using an example in which the service accessed by the user equipment is a 5G data connection service. Correspondingly, the embodiments of this disclosure are mainly described by using an example in which the charging data is data traffic—related information. The data traffic—related information includes but is not limited to information about a protocol data unit (PDU) session collected by the charging trigger device, usage of an allowed service unit in the PDU session, a charging trigger condition, a timestamp, and the like.

It should be understood that, during actual deployment, the charging system shown in FIG. 1 may have more user equipments.

According to the architecture shown in FIG. 1, the charging trigger device may obtain charging information including the guarantee status of the QoS, and send the charging information to the charging processing device. The charging processing device may perform charging processing on the guaranteed data service based on the guarantee status of the QoS, so that an operator can perform charging on the guaranteed data service "based on the guarantee status". This can improve user experience and help the operator obtain revenue corresponding to occupied network resources.

Figure 2:
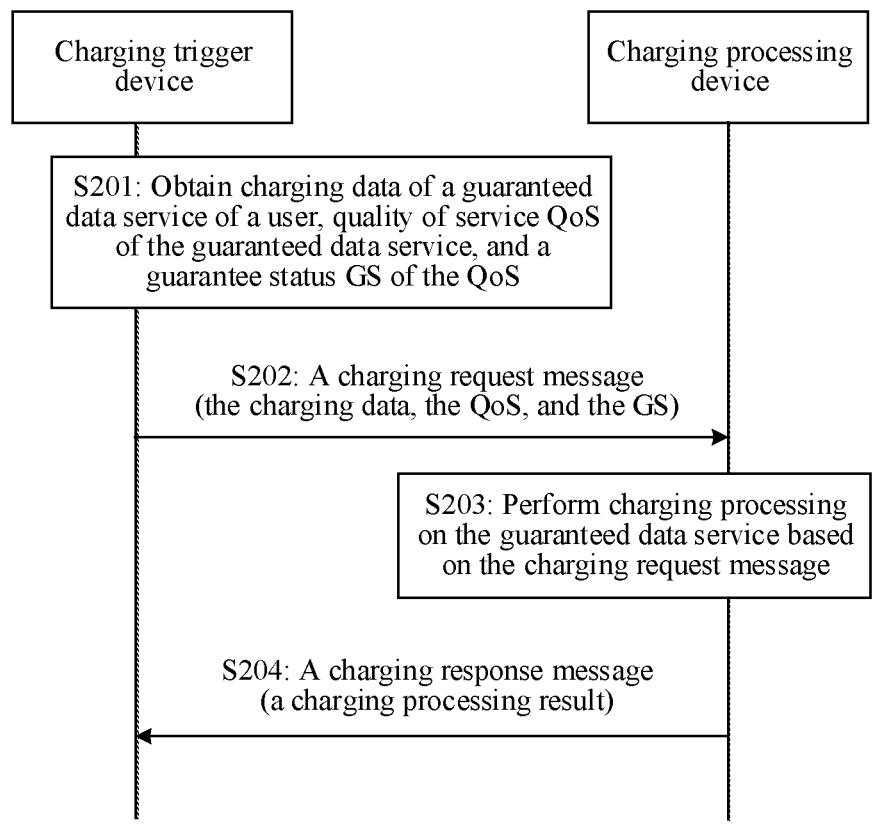
FIG. 2 is a flowchart of a first method for performing charging processing on a guaranteed data service according to an embodiment of this disclosure.

FIG. 2 is a flowchart of a first method for performing charging processing on a guaranteed data service according to an embodiment of this disclosure. The method procedure is implemented based on the architecture shown in FIG. 1. A charging trigger device corresponds to the charging trigger device 102 in FIG. 1, and a charging processing device corresponds to the charging processing device 101 in FIG. 1. The method procedure is used to perform charging processing on a guaranteed data service of a user, and includes the following steps.

Step 201: The charging trigger device obtains charging data of the guaranteed data service of the user, a quality of service QoS of the guaranteed data service, and a guarantee status GS of the QoS.

Specifically, the charging data may include usage data of the guaranteed data service, and the usage data includes usage. The usage may be traffic that is of the guaranteed data service and that is used by user equipment, or may be duration of using the guaranteed data service by the user equipment, or may be usage in another form. This is not limited in this embodiment of this disclosure. The charging data may further include a requested service unit quota of the guaranteed data service. The obtaining, by the charging trigger device, the usage data of the data service and determining the requested quota of the data service belong to the conventional technology, and details are not described.

Specifically, the charging trigger device may receive the QoS from a policy control device, or may read the QoS locally.

Specifically, the charging trigger device may locally maintain the guarantee status of the QoS, and update the locally maintained guarantee status of the QoS based on a notification that is about the guarantee status of the QoS and that is received from a radio access network. For example, the charging trigger device may set an initial value of the locally maintained guarantee status of the QoS to "guaranteed". When the radio access network cannot provide resource guarantee for the QoS, the radio access network notifies the charging trigger device, and the charging trigger device updates the guarantee status of the QoS to "non-guaranteed". When the radio access network can provide resource guarantee for the QoS again, the radio access network notifies the charging trigger device, and then the charging trigger device updates the guarantee status of the QoS to "guaranteed".

The policy control device in this embodiment of this disclosure may be a policy control function (Policy Control Function, PCF) device defined in the 3GPP standard specification.

Step 202: The charging trigger device sends a charging request message to the charging processing device, where the charging request message includes the charging data, the QoS, and the GS.

Specifically, the charging request message may be a charging resource create request message, a charging resource update request message, or a charging resource delete request message. For details, refer to subsequent embodiments of this disclosure, for example, the embodiments corresponding to FIG. 3A and FIG. 3B.

Specifically, the charging trigger device generates the charging request message, and sends the charging request message to the charging processing device. The charging request message includes the charging data, the QoS, and the GS.

It should be understood that, in addition to the charging data, the QoS, and the GS, other information in the charging resource request message may be used for charging processing, for example, an identifier of the guaranteed data service and a charging resource identifier. Details are not described in this embodiment of this disclosure.

Optionally, the charging request message further includes a 5G QoS identifier (5G QoS Indicator, 5QI) of the guaranteed data service or a resource type of the guaranteed data service. The 5QI is used to identify a 5G quality of service feature defined in the 3GPP standard specification, and the quality of service feature describes a quality of service of data packet forwarding behavior in a 5G quality of service flow (5G QoS Flow), including a resource type, a packet loss rate, a latency, and the like of the 5G quality of service flow. The resource type may be used to determine whether a data service corresponding to the 5QI is a guaranteed data service.

An example of a form of the 5QI or the resource type in the charging request message is as follows:

```
ChargingRequest {
"5QI":"15"
}
or
ChargingRequest {
"ResourceType":"GBR"
}
```

Optionally, the charging request message may further carry a parameter related to the guarantee status of the QoS of the guaranteed data service. For details, refer to subsequent embodiments of this disclosure, for example, the embodiment corresponding to FIG. 4.

Step 203: The charging processing device performs charging processing on the guaranteed data service based on the charging request message.

Specifically, the charging processing device receives the charging request message, obtains the QoS, the GS, the usage data, and the like through parsing the charging request message, and then performs charging processing on the charging data based on the QoS and the GS.

For example, if the charging data includes the usage data, the usage data, the QoS, and the GS are written into a charging data record, so that rating and billing are subsequently performed based on the charging data record, or rating is performed on the usage data based on the QoS and the GS, deduction is performed on a user account, and a corresponding quota is released. If the charging data includes the requested quota, rating is performed and a quota is granted based on the QoS and the GS. For details, refer to subsequent embodiments of this disclosure, for example, the embodiments corresponding to FIG. 1, FIG. 3A, and FIG. 3B.

Optionally, if the charging request message further includes the 5QI or the resource type, before performing charging processing on the charging data, the charging processing device may further determine, based on the 5QI or the resource type, that a quality of service of the guaranteed data service is to be guaranteed, so that during charging processing on the charging data, the guarantee status and/or a guarantee notification switch status of the QoS of the guaranteed data service are/is used as factors of the charging processing. Specifically, if the charging request message includes the 5QI, and the 5QI can be identified by the charging processing device (for example, the 5QI is defined in the 3GPP standard, or a corresponding resource type of the 5QI has been determined by the charging processing device), the charging processing device directly learns the corresponding resource type based on the 5QI, and then determines, based on the resource type, that the quality of service of the guaranteed data service is to be guaranteed. For example, if the resource type is "GBR", the charging processing device determines that the quality of service of the guaranteed data service is to be guaranteed. If the charging request message includes the 5QI and the corresponding resource type, but the 5QI cannot be identified by the charging processing device (for example, the 5QI is not defined in a standard), or the charging request message does not include the 5QI but includes only the resource type, the charging processing device performs the foregoing determining based on the resource type, and details are not described again.

It should be understood that, in another embodiment of this disclosure, the charging request messages (including the charging resource create request message and the charging resource update request message) each may include the 5QI or the resource type of the guaranteed data service. Before performing charging processing, the charging processing device may determine, based on the 5QI or the resource type, that the quality of service of the guaranteed data service is to be guaranteed, and further determine to use information about the guarantee status of the QoS as a charging factor. Details are not described again.

Optionally, according to a service requirement, the charging processing device may perform more charging processing operations based on the charging request message, for example, determine whether a guarantee notification switch on the charging trigger device needs to be turned on, set an activation status of a guarantee status trigger and/or a reporting type of the guarantee status trigger on the charging trigger device, and set an activation status of a guarantee notification switch status trigger of the QoS and/or a reporting type of the guarantee notification switch status trigger of the QoS on the charging trigger device.

Step 204: The charging processing device sends a charging response message to the charging trigger device, where the charging response message includes a charging processing result.

Specifically, the charging processing device generates the charging response message and sends the charging response message to the charging trigger device, where the charging response message includes a result of the foregoing charging processing, for example, a granted quota and an operation instruction of the guarantee notification switch.

Corresponding to the charging request message in step 202, the charging response message may be a charging resource create response message, a charging resource update response message, or a charging resource delete response message (a charging processing result in the charging resource delete response message does not include the granted quota or the operation instruction).

Correspondingly, the charging trigger device receives a first charging response message from the charging processing device; obtains the charging processing result through parsing the first charging response message; and if the charging processing result includes the granted quota, performs quota management based on the granted quota; and if the charging processing result includes the operation instruction or a management instruction, updates an activation status or a reporting type of a local trigger based on the operation instruction or the management instruction, or enables/disables a notification function based on the operation instruction or the management instruction.

In the method procedure corresponding to FIG. 2, the charging processing device may perform charging processing on the data service "based on a guarantee status", that is, perform charging processing based on the guarantee status of the QoS of the data service. This not only helps to provide a more accurate charging service for a user, but also helps an operator flexibly allocate network resources, and obtain revenue from network services of the operator in a more proper way.

Figure 3A:
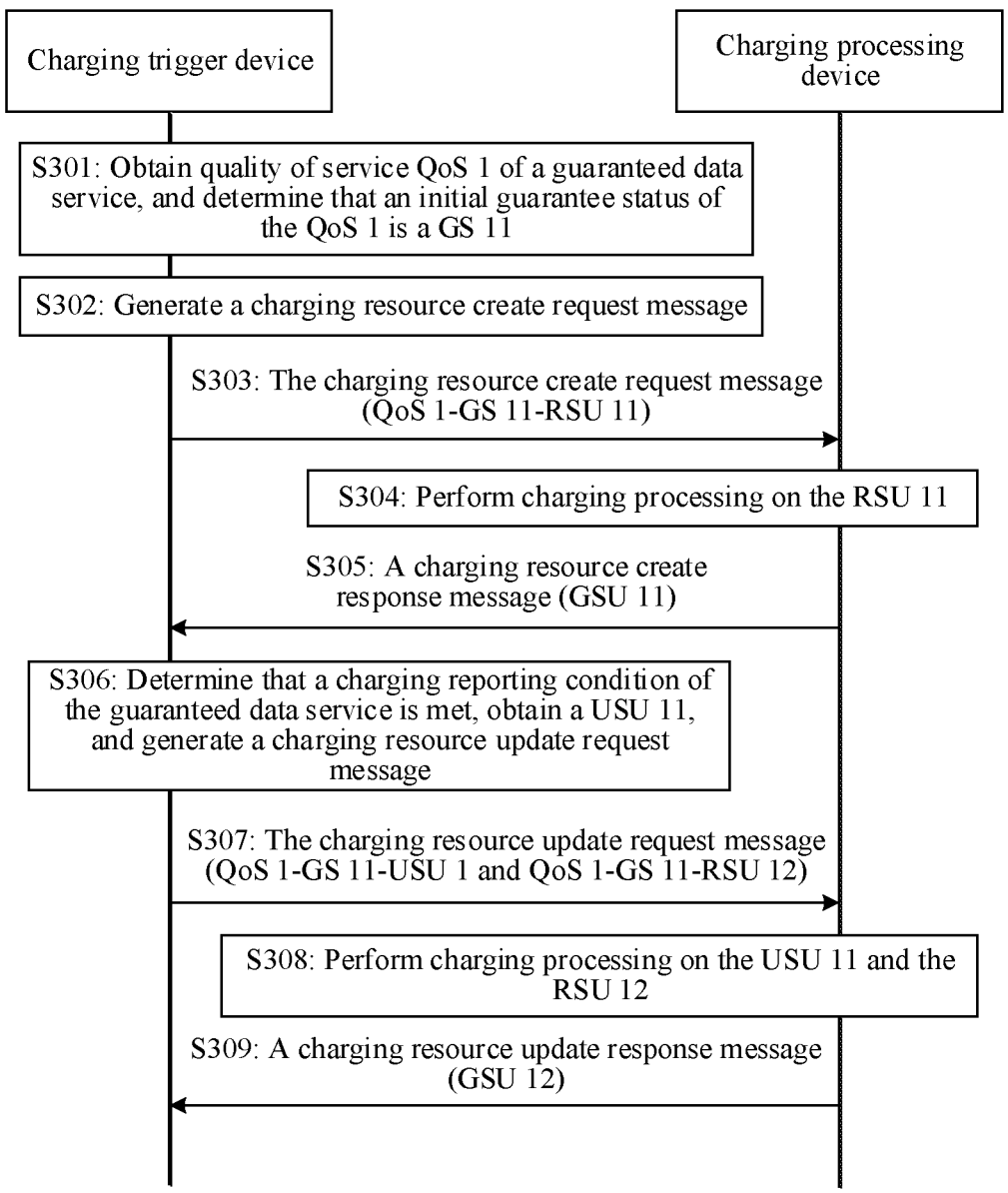
FIG. 3A and FIG. 3B are flowcharts of a second method and a third method for performing charging processing on a guaranteed data service according to an embodiment of this disclosure.
Figure 3B:
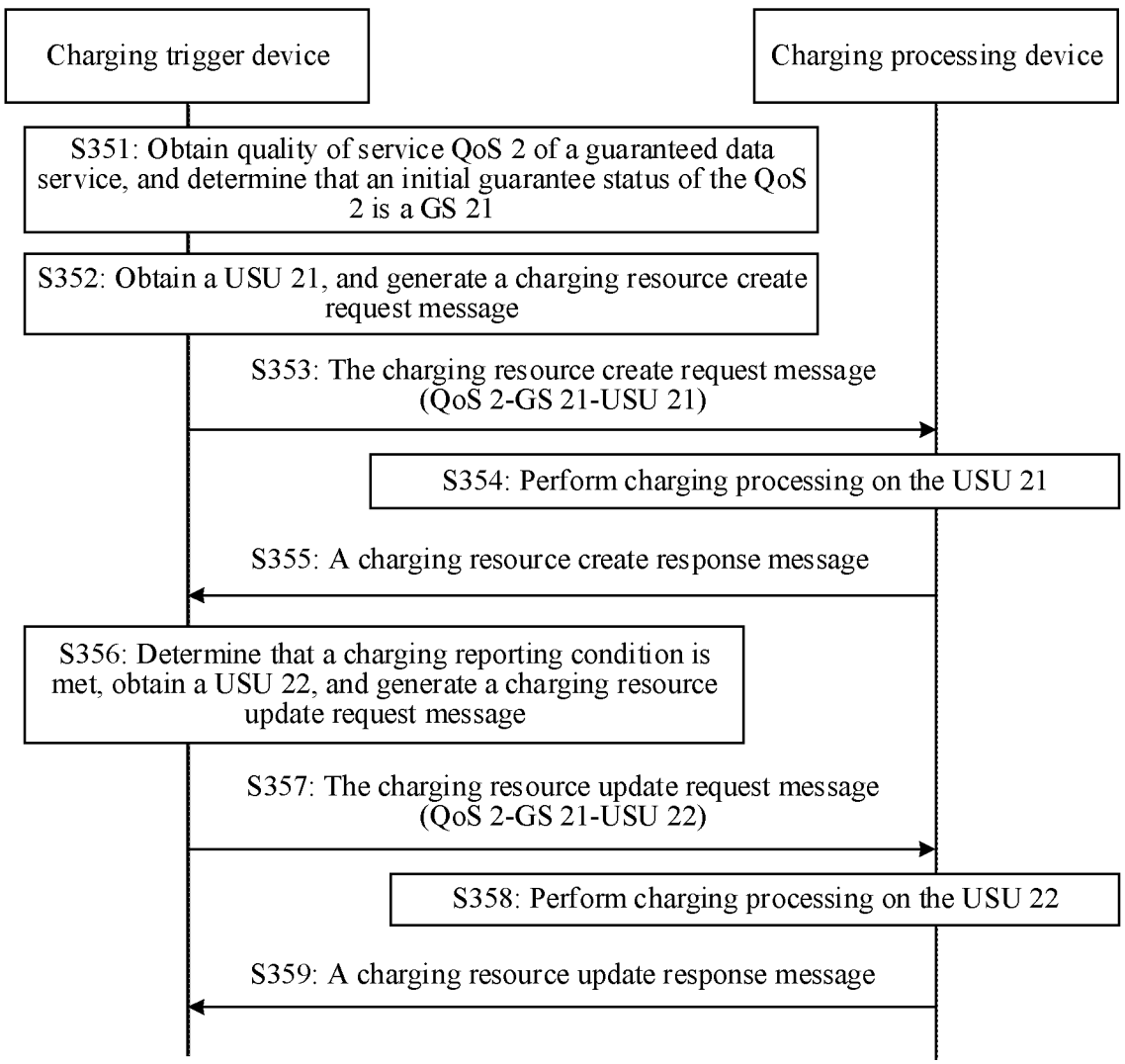

FIG. 3A and FIG. 3B are respectively flowcharts of a second method and a third method for performing charging processing on a guaranteed data service according to an embodiment of this disclosure. These method procedures are all implemented based on the architecture shown in FIG. 1. A charging trigger device corresponds to the charging trigger device 102 in FIG. 1, and a charging processing device corresponds to the charging processing device 101 in FIG. 1.

In these method procedures, it is assumed that a guarantee status of QoS of a guaranteed data service remains unchanged.

In the method procedure shown in FIG. 3A, a charging mode of the guaranteed data service is online charging, and the charging processing device performs charging processing on the guaranteed data service based on a guarantee status and charging data (including usage data and/or a requested quota) that are sent by the charging trigger device. The method procedure mainly includes the following steps.

Step 301: The charging trigger device obtains a quality of service QoS 1 of a guaranteed data service, and determines that a guarantee status of the QoS 1 is a GS 11.

Specifically, the charging processing device obtains the quality of service QoS 1 of the guaranteed data service based on a local configuration or a PCC rule delivered by a policy control device. For example, the quality of service QoS 1 is: "a guaranteed bandwidth is 100 M". The charging trigger device locally maintains the guarantee status, and updates the locally maintained guarantee status based on a guarantee status that is of the QoS and that is received from a radio access network.

Step 302: The charging trigger device generates a charging resource create request message.

Specifically, based on a service requirement, the charging trigger device generates the charging resource create request message for the guaranteed data service, where the charging resource create request message may include the QoS 1, the GS 11, and a requested quota RSU 11 that is of the guaranteed data service and that corresponds to the QoS 1 and the GS 11.

It should be understood that the QoS 1, the GS 11, and the RSU 11 may exist in a parallel manner or may exist in a nested manner in the charging resource create request message. A charging request message described in this embodiment of this disclosure includes QoS, a guarantee status, a guarantee notification switch status, and charging data. A relative location relationship of the information in the charging request message is not limited. Details are not described again.

An example of the foregoing parallel manner is as follows:

```
ChargingRequest {
RSU//requested quota{
    //amount of requested quotas
}
QoS//quality of service
GS//guarantee status
GNSS//guarantee notification switch status
}
An example of the foregoing nested manner is as follows:
ChargingRequest {
RSU//requested quota{
QoS//quality of service
GS//guarantee status
GNSS//guarantee notification switch status
//amount of requested quotas
    }
}
Another example of the foregoing nested manner is as follows:
ChargingResourceUpdateRequest {
RSU//requested quota{
QoS//quality of service{
    GS//guarantee status
GNSS//guarantee notification switch status
}
//amount of requested quotas
    }
}
```

For ease of description, in this embodiment of this disclosure, when a charging message includes an RSU, QoS, a GS, and a GNSS in the foregoing "parallel" manner, or in the foregoing "nested" manner, or in another manner, "-" is used to concatenate the information. For example, that "a charging request message includes QoS-GS-GNSS-RSU" indicates that "the charging request message includes the QoS, the GS, the GNSS, and the RSU". This does not limit a sequence and a structure of the information in the charging message. The information may be included in the foregoing parallel manner or the foregoing nested manner. This is not limited in this embodiment of this disclosure. "The charging request message includes QoS-GS-USU" and "the charging request message includes QoS-GS-GNSS-USU" may be deduced by analogy. Details are not described in this embodiment of this disclosure.

Optionally, the charging resource create request message may further include a 5QI or a resource type, so that the charging processing device determines that a quality of service of the guaranteed data service is to be guaranteed.

Step 303: The charging trigger device sends the charging resource create request message to the charging processing device, where the charging resource create request message includes QoS 1-GS 11-RSU 11.

Step 304: The charging processing device performs charging processing on the RSU 11.

Specifically, after receiving the charging request message, the charging processing device may perform charging processing on the RSU 11 based on the QoS 1 and the GS 11, for example, perform rating and grant a quota GSU 11 based on the QoS 1 and the GS 11.

Optionally, if the charging processing device obtains the 5QI or the resource type through parsing the charging resource create request message, before performing charging processing on the RSU 11 based on the QoS 1 and the GS 11, the charging processing device determines, based on the 5QI or the resource type, that the quality of service of the guaranteed data service is a data service is to be guaranteed, to determine that the QoS 1 and the GS 11 are used as rating factors during the charging processing on the RSU 11.

Optionally, the charging processing device may alternatively not perform rating based on the QoS 1 and the GS 11, but write the QoS 1, the GS 11, and the RSU 11 into a charging data record for subsequent analysis of the charging data. In this embodiment of this disclosure, when the charging request message includes the requested quota, the QoS, the guarantee status of the QoS, and the guarantee notification switch status of the QoS in the charging request message may be processed in this manner. Details are not described again.

Step 305: The charging processing device sends a charging resource create response message to the charging trigger device, where the charging resource create response message includes the GSU 11.

Specifically, the charging processing device generates the charging resource create response message and sends the charging resource create response message to the charging trigger device, where the charging resource create response message includes a charging resource identifier, the GSU 11, and the like. Subsequently, the charging trigger device may allow the guaranteed data service based on the GSU 11.

Step 306: The charging trigger device determines that a charging reporting condition of the guaranteed data service is met, obtains a USU 11, and generates a charging resource update request message.

Specifically, the charging trigger device determines that the charging reporting condition of the guaranteed data service is met, for example, a location of user equipment changes, or an access network is switched, obtains the corresponding usage data USU 11, and generates a charging request message. The message may include the QoS 1, the GS 11, and the USU 11. Optionally, the message may further include the QoS 1, the GS 11, and an RSU 12 to continue to apply for a quota, where the RSU 12 is a requested quota that is of the guaranteed data service and that corresponds to the quality of service QoS 1 and the guarantee status GS 11.

Similarly, QoS 1-GS 11-USU 11 may be parallel or nested in the charging request message. Details are not described in subsequent embodiments of this disclosure.

Step 307: The charging trigger device sends the charging resource update request message to the charging processing device, where the charging resource update request message includes QoS 1-GS 11-USU 1, or optionally may include QoS 1-GS 11-RSU 12.

Step 308: The charging processing device performs charging processing on the USU 11 and the RSU 12.

Specifically, the charging processing device receives the charging resource update request message, obtains QoS 1-GS 11-USU 1 and QoS-GS 11-RSU 12 through parsing the charging resource update request message, and performs charging processing on the USU 11 based on the QoS 1 and the GS 11. For example, the charging processing device deducts fees corresponding to usage in the USU 11 from a user account by using the QoS 1 and the GS 11 as rating factors. In addition, the charging processing device performs charging processing on the RSU 12 based on the QoS 1 and the GS 11, to obtain a granted quota GSU 12. For details, refer to the charging processing performed on the RSU 11 in step 304.

Optionally, the charging processing device may not perform rating based on the QoS 1 and the GS 11, but write the QoS 1, the GS 11, and the USU 11 into a charging data record for subsequent analysis of the charging data. In this embodiment of this disclosure, when the charging request message includes the requested quota, the QoS, the guarantee status of the QoS, and the guarantee notification switch status of the QoS in the charging request message may be processed in this manner. Details are not described again.

Step 309: The charging processing device sends a charging resource update response message to the charging trigger device, where the charging resource update response message includes the GSU 12.

Specifically, the charging processing device generates the charging resource update response message, and sends the charging resource update response message to the charging trigger device, where the response message includes the GSU 12.

Correspondingly, the charging trigger device receives the charging resource update response message, obtains the GSU 12 through parsing the response message, and performs quota management based on the GSU 12.

In the embodiment corresponding to FIG. 3A, the charging processing device may perform, based on the guarantee status of the QoS, charging processing on the requested quota and the usage data of the guaranteed data service, so that charging accuracy can be improved, a loss of an operator can be avoided, and network resources of the operator can be flexibly allocated.

In the method procedure shown in FIG. 3B, a charging mode of the guaranteed data service is offline charging, and the charging processing device performs charging processing on the guaranteed data service based on a guarantee status and charging data (including usage data) that are sent by the charging trigger device. The method procedure mainly includes the following steps:

Step 351: The charging trigger device obtains a quality of service QoS 2 of a guaranteed data service, and determines that a guarantee status of the QoS 2 is a GS 21.

This step is similar to step 301, and details are not described again.

Step 352: The charging trigger device obtains a USU 21 and generates a charging resource create request message.

Specifically, the charging trigger device obtains the initial usage data USU 21 of the guaranteed data service, and generates the charging resource create request message, where the message includes QoS 2-GS 21-USU 21.

Step 353: The charging trigger device sends the charging resource create request message to the charging processing device, where the request message includes QoS 2-GS 21-USU 21.

Step 354: The charging processing device performs charging processing on the USU 21.

Specifically, the charging processing device receives the charging resource create request message, obtains the QoS 2, the GS 21, and the USU 21 through parsing the charging resource create request message, and then performs charging processing on the USU 21 based on the QoS 2 and the GS 21, for example, generates a charging data record based on the QoS 2 and the GS 21.

Step 355: The charging processing device sends a charging resource create response message to the charging trigger device.

The charging resource create response message may include a charging resource identifier and a success flag.

Step 356: The charging trigger device determines that a charging reporting condition is met, obtains a USU 22, and generates a charging resource update request message.

This step is similar to step 306, but a requested quota does not need to be processed, and details are not described again.

Step 357: The charging trigger device sends the charging resource update request message to the charging processing device, where the charging resource update request message includes QoS 2-GS 21-USU 22.

Step 358: The charging processing device performs charging processing on the USU 22.

This step is similar to step 354, and details are not described again.

Step 359: The charging processing device sends a charging resource update response message to the charging trigger device.

Correspondingly, the charging trigger device subsequently receives the charging resource update response message, and determines, based on the success flag in the message, that the charging processing succeeds. It should be understood that the GSU 12 and the success flag are charging processing results.

According to the method procedure corresponding to FIG. 3B, the charging processing device performs charging on the offline charging guaranteed data service "based on the guarantee status".

Because network resources are limited, sometimes the radio access network may be unable to reserve sufficient network resources for the guaranteed data service. This may cause a change in the guarantee status of the QoS of the guaranteed data service. In this case, if a charging processing policy cannot be adjusted in a timely manner based on the change in the guarantee status of the QoS, accuracy or fairness of charging is inevitably affected, and user experience may be affected. Therefore, the charging trigger device may report, to the charging processing device based on the change in the guarantee status of the QoS, the charging data that exists before the change and charging data that exists after the change in different guarantee statuses, for charging processing. For details, refer to method procedures corresponding to FIG. 5A to FIG. 5D. Before this, the charging trigger device may first receive a management instruction from the charging processing device, to prepare for reporting the charging data. For details, refer to the method procedure corresponding to FIG. 4.

Figure 4:
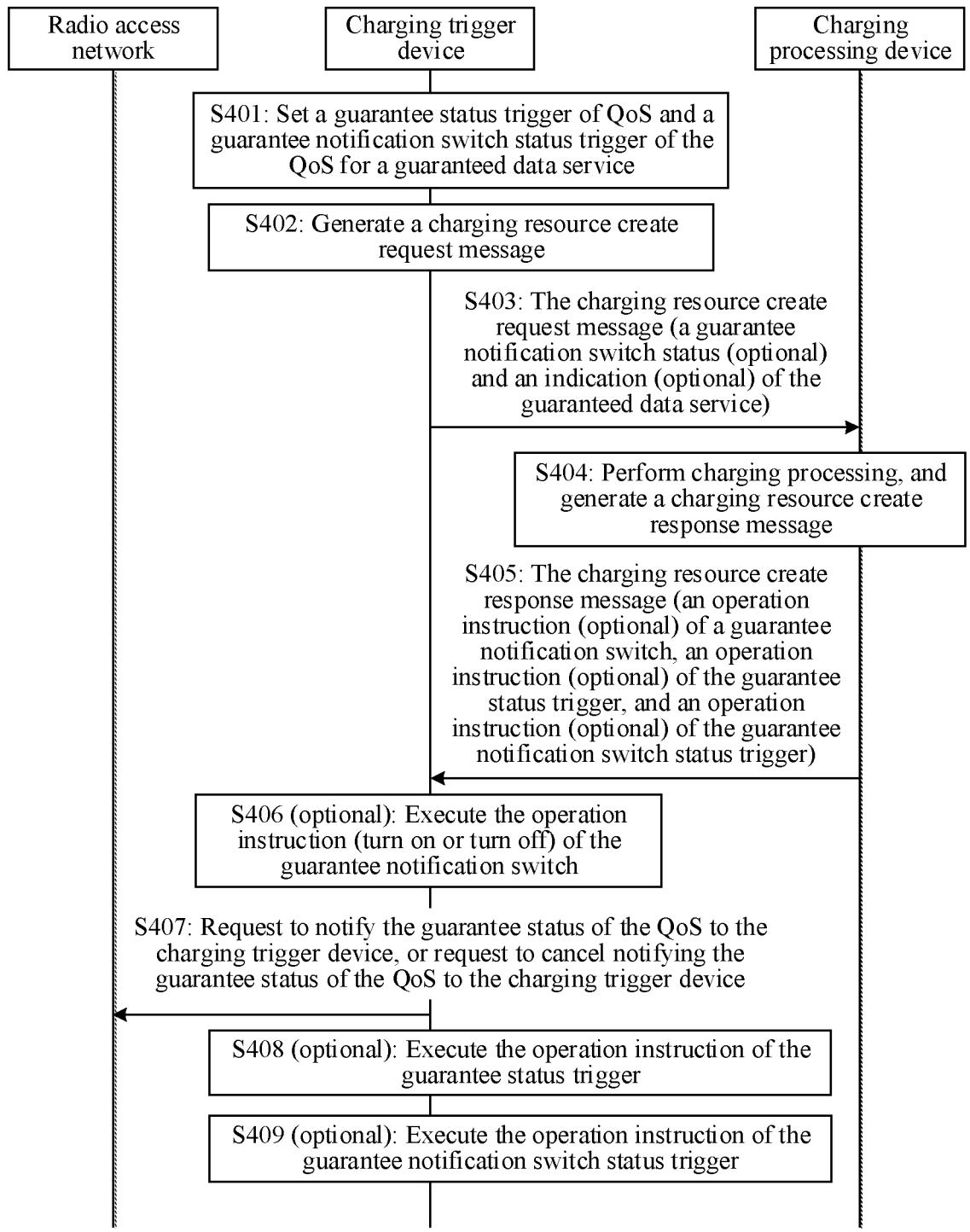
FIG. 4 is a flowchart of a fourth method for performing charging processing on a guaranteed data service according to an embodiment of this disclosure.

FIG. 4 is a flowchart of a fourth method for performing charging processing on a guaranteed data service according to an embodiment of this disclosure. The method procedure is implemented based on the architecture shown in FIG. 1. A charging trigger device corresponds to the charging trigger device 102 in FIG. 1, a charging processing device corresponds to the charging processing device 101 in FIG. 1, and a radio access network corresponds to the radio access network 103 in FIG. 1. In the method procedure, the charging processing device may send a management instruction to the charging trigger device. The method mainly includes the following steps.

Step 401: The charging trigger device sets a guarantee status trigger of QoS and a guarantee notification switch status trigger of the QoS for a guaranteed data service.

Specifically, the charging trigger device may set the guarantee status trigger of the QoS and the guarantee notification switch status trigger of the QoS for the guaranteed data service during initialization or when a user subscribes to a service.

A reporting type of the guarantee status trigger may be set to immediate reporting or deferred reporting, and an activation status of the guarantee status trigger may be set to "activated" or "deactivated".

A reporting type of the guarantee notification switch status trigger may be set to immediate reporting or deferred reporting, and an activation status of the guarantee notification switch status trigger of the QoS may be set to "activated" or "deactivated".

Step 402: The charging trigger device generates a charging resource create request message.

Specifically, the charging trigger device generates the charging resource create request message for the guaranteed data service. The charging resource create request message includes an indication of the guaranteed data service, and the indication of the guaranteed data service is a 5QI of the guaranteed data service or a resource type of the guaranteed data service.

Optionally, the charging trigger device may include a guarantee notification switch status of the QoS in the charging resource create request message.

Optionally, the charging trigger device may include a guarantee status of the QoS in the charging resource create request message.

It should be understood that if a charging mode of the guaranteed data service is online charging, the charging resource create request message may further include a requested quota of the guaranteed data service, a corresponding guarantee status, and the like; and if the charging mode of the guaranteed data service is offline charging, the charging resource create request message may further include usage data of the guaranteed data service, a corresponding guarantee status, and the like. Therefore, corresponding processing is performed in subsequent steps 403, 404, and 405. For details, refer to another method procedure in this disclosure, for example, method procedures in FIG. 3A, FIG. 3B, FIG. 5A to FIG. 5D, and FIG. 6A to FIG. 6D.

For ease of description, descriptions of sending and processing the information are omitted in this method procedure.

Step 403: The charging trigger device sends the charging resource create request message to the charging processing device, where the request message includes an indication of the guaranteed data service, the guarantee notification switch status of the QoS, and the guarantee status of the QoS.

The QoS guarantee notification switch status and the QoS guarantee status are optional.

Step 404: The charging processing device performs a charging processing operation, and generates a charging resource create response message.

Specifically, the charging processing device receives and parses the charging resource create request message, determines, based on the indication of the guaranteed data service in the guaranteed data service, that a quality of service of the guaranteed data service is to be guaranteed, and further determines that charging processing that is based on the guarantee status of the QoS is to be performed. For example, after determining that the quality of service of the guaranteed data service is to be guaranteed, the charging processing device may first determine, based on subscription information of a user, that the user has subscribed to the guaranteed service, and then determine that charging processing that is based on the guarantee status of the QoS is to be performed.

On this basis, the charging processing device may perform one or more of the following items:

determining whether the activation status of the guarantee status trigger of the QoS on the charging trigger device and/or the reporting type of the guarantee status trigger are/is to be set, and if the activation status and/or the type are/is to be set, including a corresponding operation instruction in the generated charging response message as a part of a charging processing result, where the operation instruction may include a target activation status and/or a target type, and the charging processing device may determine, according to a locally configured policy, that the activation status of the guarantee status trigger on the charging trigger device and/or the reporting type of the guarantee status trigger are/is to be set;

determining whether the activation status of the guarantee notification switch status trigger of the QoS on the charging trigger device and/or the reporting type of the guarantee notification switch status trigger are/is to be set, and if the activation status and/or the type are/is to be set, including a corresponding operation instruction in the generated charging response message as a part of a charging processing result, where the operation instruction may include a target activation status and/or a target type, and the charging processing device may determine, according to a locally configured policy, that the activation status of the guarantee notification switch status trigger on the charging trigger device and/or the reporting type of the guarantee notification switch status trigger are/is to be set; and determining, based on the guarantee notification switch status in the charging resource create request message, a current status of the guarantee notification switch of the QoS on the charging trigger device, further determining whether to deliver an instruction to set the guarantee notification switch of the QoS, and when the guarantee notification switch is to be set, including a corresponding operation instruction in the generated charging response message as a part of the charging processing result. When the current status of the guarantee notification switch of the QoS is off, the charging processing device may include, in the generated charging resource create response message, an operation instruction for instructing the charging processing device to turn on the guarantee notification switch, or optionally, the charging processing device may determine to treat, charging data that is of the guaranteed data service and that is received after the charging resource create request message is received as charging data that is of the guaranteed data service and that exists when the guarantee status of the QoS is a non-guaranteed status, for charging processing. The charging processing device may alternatively determine, according to a locally configured policy, that a status of the guarantee notification switch on the charging trigger device is to be set.

Step 405: The charging processing device sends the charging resource create response message to the charging trigger device, where the response message includes an operation instruction (optional) of the guarantee notification switch, an operation instruction (optional) of the guarantee status trigger, and an operation instruction (optional) of the guarantee notification switch status trigger.

The charging trigger device receives and parses the charging resource create response message, obtains the operation instruction of the guarantee notification switch, the operation instruction of the guarantee status trigger, and the operation instruction of the guarantee notification switch status trigger from the charging resource create response message, and executes the corresponding operation instruction according to the following steps.

Step 406 (Optional): The charging trigger device executes the operation instruction of the guarantee notification switch.

Specifically, if the charging resource create response message includes the operation instruction of the guarantee notification switch, step 407 is performed. The operation instruction of the guarantee notification switch may instruct to turn on the guarantee notification switch, or may instruct to turn off the guarantee notification switch.

Step 407: The charging trigger device requests a radio access network to notify the guarantee status of the QoS to the charging trigger device, or requests a radio access network to cancel notifying the guarantee status of the QoS to the charging trigger device.

Specifically, if the operation instruction of the guarantee notification switch instructs to turn on the guarantee notification switch and the current status of the guarantee notification switch is off, the charging trigger device requests the radio access network to notify the guarantee status of the QoS to the charging trigger device; or if the operation instruction of the guarantee notification switch instructs to turn off the guarantee notification switch of the QoS and the guarantee notification switch can be turned off currently, the charging trigger device requests the radio access network to cancel notifying the guarantee status of the QoS of the guaranteed data service to the charging trigger device. That guarantee notification switch can be turned off means that the guarantee notification switch is turned on currently, and no other entity (for example, the policy control device) currently uses the guarantee notification switch.

Step 408 (Optional): The charging trigger device executes the operation instruction of the guarantee status trigger.

Specifically, if the charging resource create response message includes the operation instruction of the guarantee status trigger, the charging trigger device sets the activation status of the guarantee status trigger of the QoS on the charging trigger device and/or the reporting type of the guarantee status trigger based on the operation instruction, or overwrites, based on an activation status and/or a type in the operation instruction, the activation status of the guarantee status trigger of the QoS on the charging trigger device and/or the reporting type of the guarantee status trigger that are/is currently set.

Step 409 (Optional): The charging trigger device executes the operation instruction of the guarantee notification switch status trigger.

Specifically, if the charging resource create response message includes the operation instruction of the guarantee notification switch status trigger, the charging trigger device sets the activation status of the guarantee notification switch status trigger of the QoS on the charging trigger device and/or the reporting type of the guarantee notification switch status trigger based on the operation instruction, or overwrites, based on an activation status and/or a type in the operation instruction, the activation status of the guarantee notification switch status trigger of the QoS on the charging trigger device and/or the reporting type of the guarantee notification switch status trigger that are/is currently set.

A sequence for performing steps 406 to 409 is not limited. The foregoing sequence is merely an example. The charging trigger device may perform the foregoing steps in another sequence.

It should be understood that a form of the operation instruction is not limited in this embodiment of this disclosure. For example, the operation instruction may be a field or a flag bit in the charging response message.

In the method procedure corresponding to FIG. 4, the charging processing device may deliver the operation instruction, so that a capability of the charging processing device to manage behavior of reporting the guarantee status of the QoS of the guaranteed data service can be improved, to implement more flexible charging.

The method procedure corresponding to FIG. 4 may be used as a prerequisite for executing the method procedures in FIG. 5A to FIG. 5D and FIG. 6A to FIG. 6D, or may be executed in these method procedures.

FIG. 5A to FIG. 5D are respectively flowcharts of a fifth method to an eighth method for performing charging processing on a guaranteed data service according to an embodiment of this disclosure. These method procedures are implemented based on the architecture shown in FIG. 1. A charging trigger device corresponds to the charging trigger device 102 in FIG. 1, a charging processing device corresponds to the charging processing device 101 in FIG. 1, and a radio access network corresponds to the radio access network 103 in FIG. 1. In these method procedures, it is assumed that a guarantee status of QoS of a guaranteed data service changes.

Figure 5A:
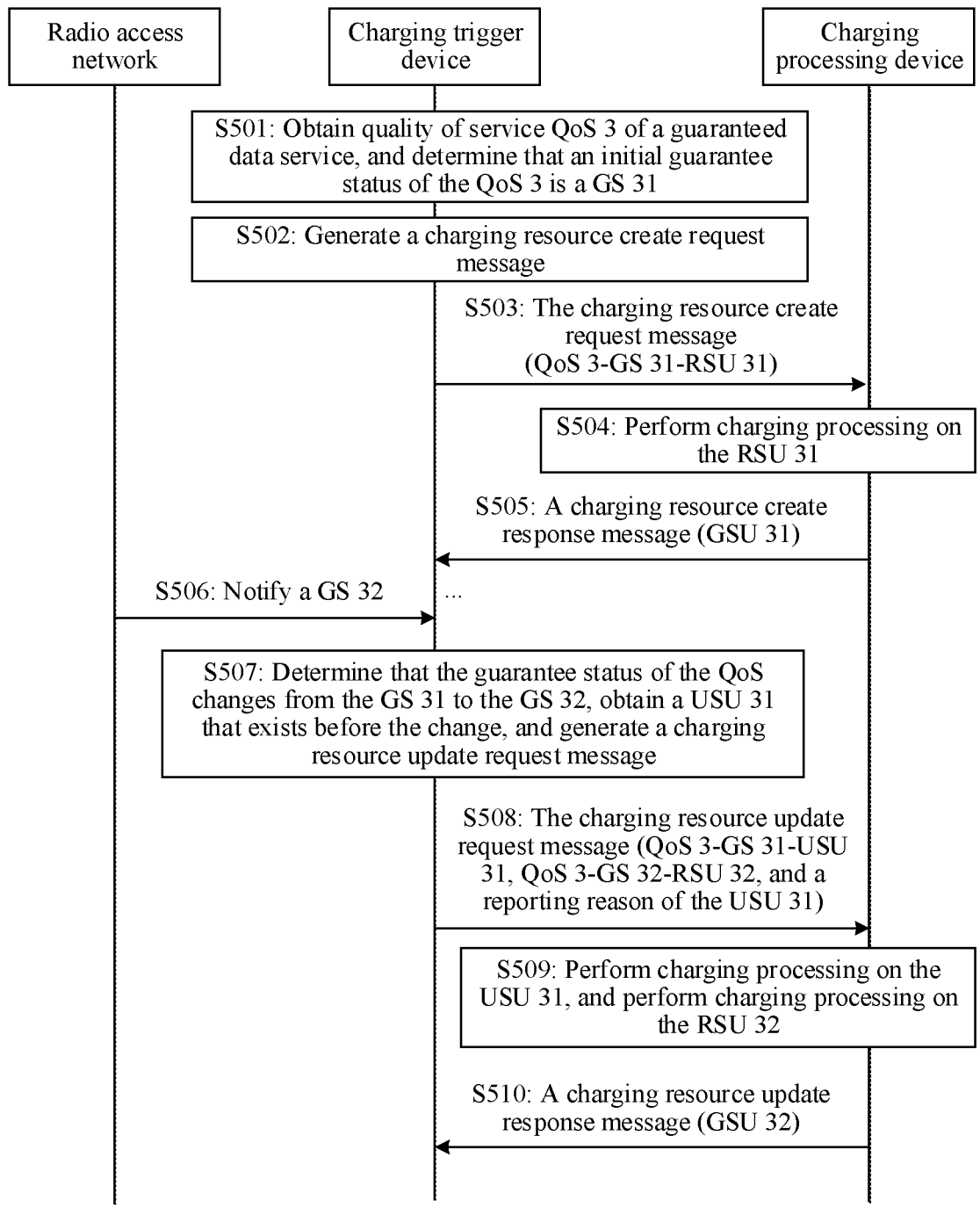
FIG. 5A to FIG. 5D are flowcharts of a fifth method to an eighth method for performing charging processing on a guaranteed data service according to an embodiment of this disclosure.

In the method procedure shown in FIG. 5A, a charging mode of the guaranteed data service is online charging, and when determining that the guarantee status of the QoS changes, the charging trigger device immediately reports charging data that exists before the change and charging data that exists after the change. The method procedure mainly includes the following steps.

Step 501: The charging trigger device obtains a quality of service QoS 3 of a guaranteed data service, and determines that a guarantee status of the QoS 3 is a GS 31 (relatively referred to as a first guarantee status).

This step is similar to step 301, and details are not described again.

Step 502: The charging trigger device generates a charging resource create request message.

This step is similar to step 302, and details are not described again.

Step 503: The charging trigger device sends the charging resource create request message to the charging processing device, where the charging resource create request message includes QoS 3-GS 31-RSU 31.

This step is similar to step 303, and details are not described again. The requested quota RSU 31 is equivalent to the RSU 11 in step 302.

Step 504: The charging processing device performs charging processing on the requested quota RSU 31 based on the QoS 3 and the GS 31.

This step is similar to step 304, and details are not described again.

Step 505: The charging processing device sends a charging resource create response message to the charging trigger device, where the charging resource create response message includes a granted quota GSU 31.

This step is similar to step 305, and details are not described again. The granted quota GSU 31 is equivalent to the GSU 11 in step 305.

Step 506: The radio access network notifies a GS 32.

Specifically, the radio access network may be a base station in a radio access network, for example, a gNB device or an eNB device defined in the 3GPP standard specification, and may send the guarantee status GS 32 (relatively referred to as a second guarantee status) of the QoS 3, for example, "non-guaranteed", to the charging trigger device.

Step 507: The charging trigger device determines that the guarantee status of the QoS changes from the GS 31 to the GS 32, obtains a USU 31 (relatively, referred to as first usage data) that exists before the change, and generates a charging resource update request message.

Specifically, the charging trigger device compares the new guarantee status GS 32 received from the radio access network with the determined guarantee status GS 31, to determine that the guarantee status of the QoS 3 changes. If a reporting type of an activated guarantee status trigger of the QoS 3 is set to immediate reporting, the charging trigger device obtains the usage data USU 31 that exists before the change, and generates the charging resource update request message based on the usage data, where the message includes QoS 3-GS 31-USU 31 and a reporting reason of the USU 31. The reporting reason indicates that the USU 31 is sent to the charging processing device because the guarantee status of the QoS changes. Optionally, the message may further include QoS 3-GS 32-RSU 32, where the RSU 32 is a requested quota that is of the guaranteed data service and that corresponds to the QoS 3 and the GS 32.

Step 508: The charging trigger device sends the charging resource update request message to the charging processing device, where the message includes QoS 3-GS 31-USU 31, the reporting reason of the USU 31, and QoS 3-GS 32-RSU 32.

The QoS 3, the GS 32, the RSU 32, and the reporting reason of the USU 31 are optional.

Step 509: The charging processing device performs charging processing on the USU 31 and performs charging processing on the RSU 32.

This step is similar to step 308, and details are not described again.

Step 510: The charging processing device sends a charging resource update response message to the charging trigger device, where the charging resource update response message includes a GSU 32.

Figure 5B:
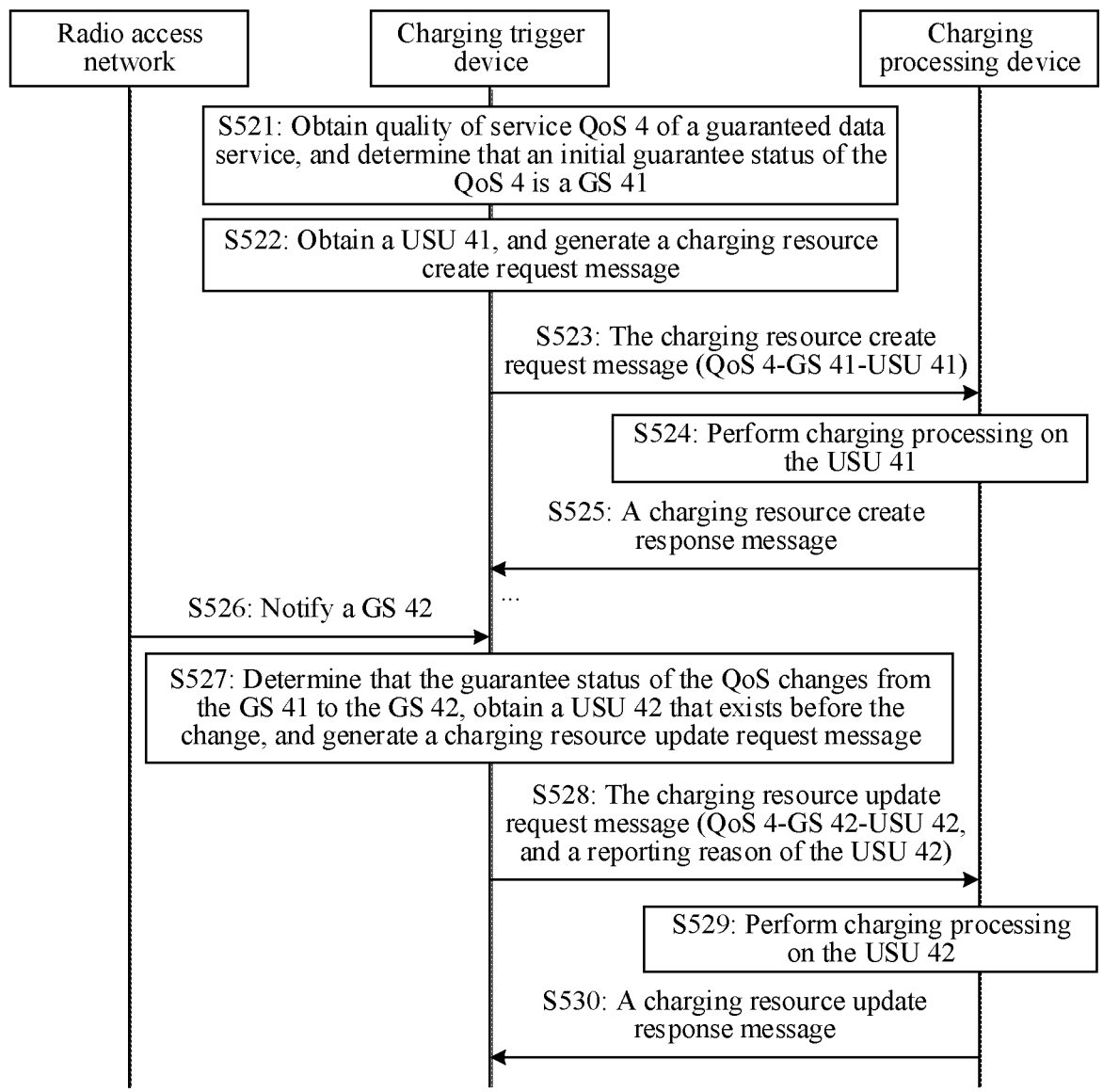

In the method procedure shown in FIG. 5B, a charging mode of the guaranteed data service is offline charging, and when determining that the guarantee status of the QoS changes, the charging trigger device immediately reports usage data that exists before the change. The method procedure mainly includes the following steps.

A process of step 521 to step 525 is similar to a process of step 351 to step 355, and details are not described again.

Step 526 is similar to step 506, and details are not described again.

Step 527: The charging trigger device determines that the guarantee status of the QoS changes from the GS 41 to the GS 42, obtains a USU 41 (relatively, referred to as first usage data) that exists before the change, and generates a charging resource update request message.

This step is similar to step 507, but because the charging mode is offline charging, the generated charging resource update request message does not need to include a requested quota.

Step 528: The charging trigger device sends the charging resource update request message to the charging processing device, where the message includes QoS 4-GS 41-USU 41 and a reporting reason of the USU 41.

This step is similar to step 508, and details are not described again.

Step 529: The charging processing device performs charging processing on the USU 41.

This step is similar to step 358, and details are not described again.

Step 530: The charging processing device sends a charging resource update response message to the charging trigger device.

This step is similar to step 359, and details are not described again.

In the method procedures corresponding to FIG. 5A and FIG. 5B, when the guarantee status of the QoS changes, the charging processing device may still perform charging "based on the guarantee status", to avoid a charging error. In addition, the immediate reporting mechanism ensures that the change of the guarantee status is reflected in a charging processing result in a more timely manner, and this helps improve user experience.

Figure 5C:
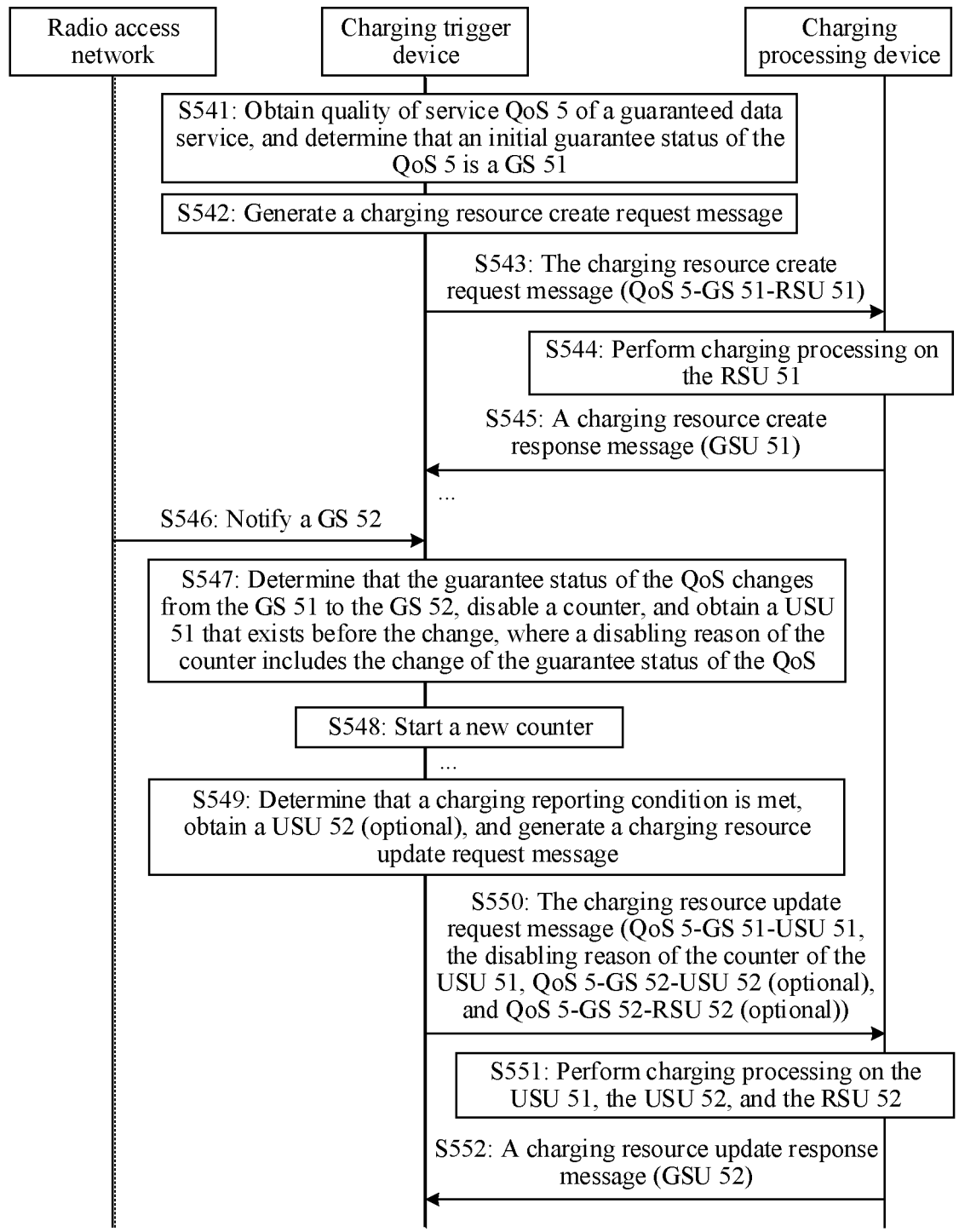

In the method procedure shown in FIG. 5C, a charging mode of the guaranteed data service is online charging, and when determining that the guarantee status of the QoS changes, the charging trigger device defers reporting of usage data that exists before the change. The method procedure mainly includes the following steps.

A process of step 541 to step 546 is similar to a process of step 501 to step 506, and details are not described again.

Step 547: The charging trigger device determines that the guarantee status of the QoS changes from the GS 51 to the GS 52, disables a counter, and obtains a USU 51 that exists before the change, where a disabling reason includes the change of the guarantee status of the QoS.

Specifically, the charging trigger device compares the new guarantee status GS 52 received from the radio access network with the determined guarantee status GS 51, to determine that the guarantee status of the QoS 5 changes. If a QoS 5-based guarantee status trigger on the charging trigger device has been activated, and a reporting type of the trigger is deferred reporting, the charging trigger device obtains the usage data USU 51 that exists before the change, and does not generate a charging resource update request message temporarily, but stores the USU 51 and the disabling reason of the counter of the USU 51. The disabling reason indicates that the counter is disabled because the guarantee status of the QoS changes. In this way, when a first charging reporting condition (for example, a user location changes) is met after the guarantee status changes, the charging trigger device may report the stored USU 51 and the stored disabling reason of the counter to the charging processing device by using a charging request message.

Step 548: The charging trigger device starts a new counter.

Specifically, the charging trigger device starts the new counter at the same time as step 547 or after step 547, to collect subsequent usage of the guaranteed data service.

Step 549: The charging processing device determines that a charging reporting condition is met, obtains a USU 52 (relatively referred to as first usage data) (optional), and generates a charging resource update request message.

Specifically, if the charging trigger device determines that a charging reporting condition (for example, a user location changes) of the guaranteed data service is met, or a charging reporting condition of another data service (for example, a data service other than the guaranteed data service in a same PDU session) is met, the charging trigger device obtains the stored USU 51 and the stored disabling reason of the counter of the USU 51, and generates the charging resource update request message.

If the charging reporting condition of the another data service is met, the charging resource update request message may include QoS 5-GS 51-USU 51, the disabling reason of the counter of the USU 51, and QoS 5-GS 52-RSU 52. The RSU 52 is a requested quota that is of the guaranteed data service and that corresponds to the QoS 5 and the GS 52.

If the charging reporting condition of the guaranteed data service is met, in addition to QoS 5-GS 51-USU 51 and the disabling reason of the counter of the USU 51, the charging resource update request message may further include QoS 5-GS 52-USU 52 and QoS 5-GS 52-RSU 52. The USU 52 (relatively referred to as second usage data) is usage data that exists between a time point at which the guarantee status changes and a time point at which the charging reporting condition of the guaranteed data service is met. The RSU 52 is a requested quota that is of the guaranteed data service and that corresponds to the QoS 5 and the GS 52. Therefore, in this case, the charging trigger device further obtains the USU 52.

Step 550: The charging processing device sends the charging resource update request message to the charging trigger device, where the request message includes QoS 5-GS 51-USU 51, the disabling reason of the counter of the USU 51, QoS 5-GS 52-USU 52, and QoS 5-GS 52-RSU 52. QoS 5-GS 52-USU 52 is optional.

Step 551: The charging processing device performs charging processing on the USU 51, the USU 52, and the RSU 52.

Specifically, the charging processing device receives and parses the charging resource update request message, and performs the following steps:

If the charging resource update request message includes QoS 5-GS 51-USU 51, the charging processing device performs charging processing on the USU 51 based on QoS 5-GS 51. For the charging processing on the usage data based on the QoS and the guarantee status, refer to the method procedure in FIG. 3A. Details are not described again.

If the charging resource update request message includes QoS 5-GS 52-USU 52, the charging processing device performs charging processing on the USU 52 based on QoS 5-GS 52.

If the charging resource update request message includes QoS 5-GS 52-RSU 52, the charging processing device performs charging processing on the RSU 52 based on QoS 5-GS 52, to obtain a granted quota GSU 52. For the charging processing on the requested quota based on the QoS and the guarantee status, refer to the method procedure in FIG. 3A. Details are not described again.

If the charging resource update request message includes the disabling reason of the counter of the USU 51, the charging trigger device may determine, based on the reason, that the guarantee status of the QoS of the guaranteed data service changes, and then perform accurate charging processing.

Step 552: The charging processing device sends a charging resource update response message to the charging trigger device, where the response message includes the GSU 52.

This step is similar to step 510, and details are not described again.

Figure 5D:
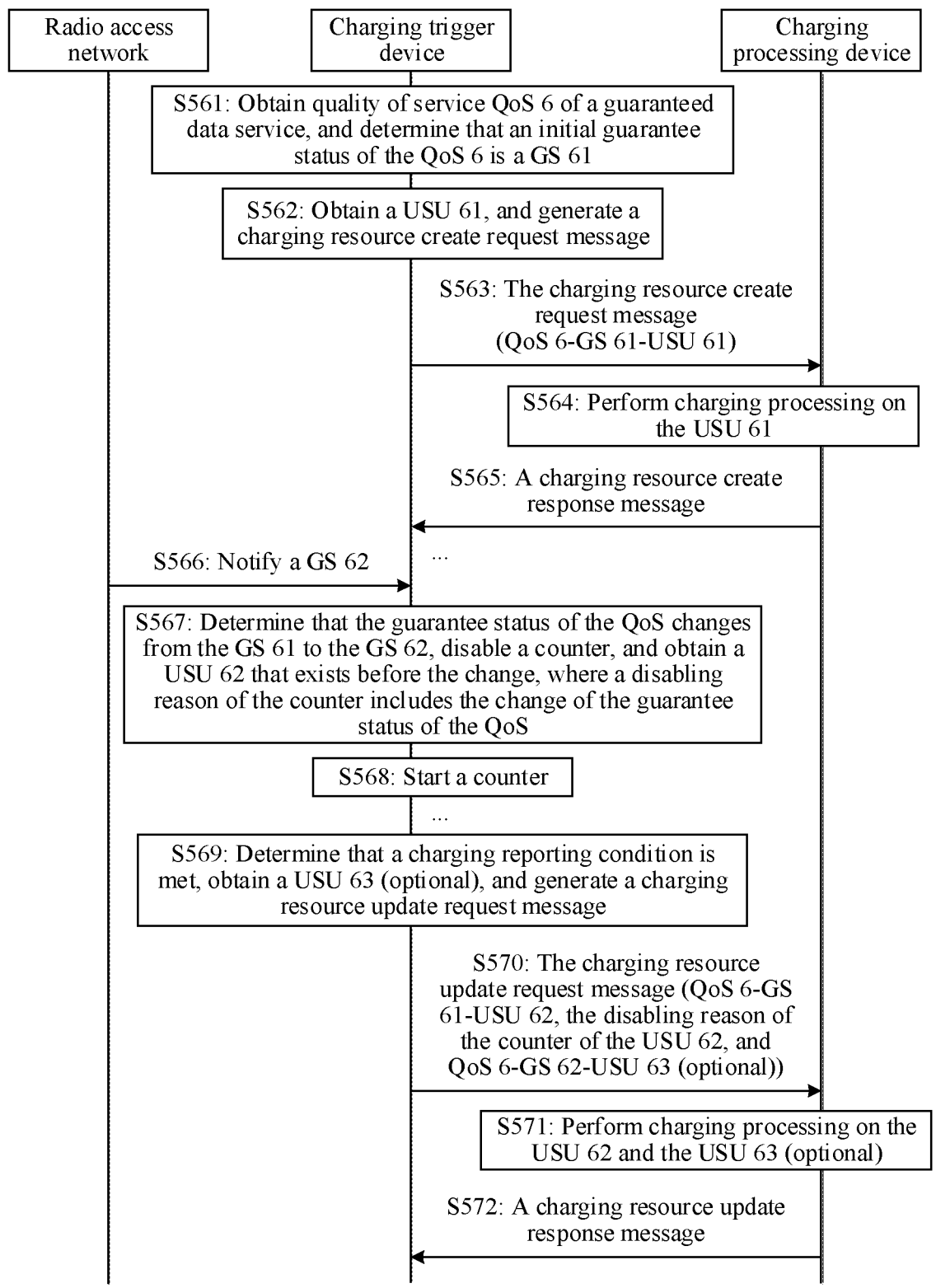

In the method procedure shown in FIG. 5D, a charging mode of the guaranteed data service is offline charging, and when determining that the guarantee status of the QoS changes, the charging trigger device defers reporting of usage data that exists before the change. The method procedure mainly includes the following steps.

Step 561 to step 566 are similar to step 521 to step 526, and details are not described again.

Step 567 and step 568 are similar to step 547 and step 548, and details are not described again.

Step 569: The charging trigger device determines that a charging reporting condition is met, obtains a USU 63, and generates a charging resource update request message.

Specifically, if the charging trigger device determines that a charging reporting condition (for example, a user location changes) of the guaranteed data service is met, or a charging reporting condition of another data service (for example, a data service other than the guaranteed data service in a same PDU session) is met, the charging trigger device obtains the USU 62 (relatively referred to as first usage data) and the disabling reason of the counter of the USU 62 that are stored in step 567, and generates the charging resource update request message.

If a charging reporting condition of another data service is met, the charging resource update request message may include QoS 6-GS 61-USU 62 and the disabling reason of the counter of the USU 62.

If the charging reporting condition of the guaranteed data service is met, in addition to QoS 6-GS 61-USU 62 and the disabling reason of the counter of the USU 62, the charging resource update request message may further include QoS 6-GS 62-USU 63. The USU 63 (relatively referred to as second usage data) is usage data that exists between a time point at which the guarantee status changes and a time point at which the charging reporting condition of the guaranteed data service is met. Therefore, in this case, the charging trigger device further obtains the USU 63.

Step 570: The charging processing device sends the charging resource update request message to the charging trigger device, where the request message includes QoS 6-GS 61-USU 62, the disabling reason of the counter of the USU 62, and QoS 6-GS 62-USU 63 (optional).

QoS 6-GS 62-USU 63 is optional. This step is similar to step 550. However, because the charging resource update request message does not include a requested quota of the guaranteed data service, corresponding charging processing is not required.

Step 571: The charging processing device performs charging processing on the USU 62 and the USU 63 (optional).

Specifically, the charging processing device receives and parses the charging resource update request message, and performs the following steps:

If the charging resource update request message includes QoS 6-GS 61-USU 62, the charging processing device performs charging processing on the USU 62 based on QoS 6-GS 61. For the charging processing on the usage data based on the QoS and the guarantee status, refer to the method procedure in FIG. 3A. Details are not described again.

If the charging resource update request message includes QoS 6-GS 62-USU 63, the charging processing device performs charging processing on the USU 63 based on QoS 6-GS 62.

If the charging resource update request message includes the disabling reason of the counter of the USU 62, the charging trigger device may determine, based on the reason, that the guarantee status of the QoS of the guaranteed data service changes, and then perform accurate charging processing.

Step 572: The charging processing device sends a charging resource update response message to the charging trigger device.

Correspondingly, the charging trigger device subsequently receives the charging resource update response message, and determines that the charging processing succeeds.

In the method procedures corresponding to FIG. 5C and FIG. 5D, the charging processing device may still perform charging "based on the guarantee status" when the guarantee status of the QoS changes, and the deferred reporting mechanism not only can implement more flexible charging for a user, but also can reduce interactions between the charging trigger device and the charging processing device and reduce pressure on a gateway and the charging processing device.

In the method procedures corresponding to FIG. 5A to FIG. 5D, a guarantee notification switch of the QoS of the guaranteed data service on the charging trigger device is turned on by default. When considering that a status of the switch may change due to various factors (for example, if a policy control device delivers a policy control rule to the charging trigger device, the status of the switch may change), to ensure charging accuracy, a guarantee notification switch status may be further reported to the charging processing device.

FIG. 6A to FIG. 6D are respectively flowcharts of a ninth method to a twelfth method for performing charging processing on a guaranteed data service according to an embodiment of this disclosure. These method procedures are implemented based on the architecture shown in FIG. 1. A charging trigger device corresponds to the charging trigger device 102 in FIG. 1, a charging processing device corresponds to the charging processing device 101 in FIG. 1, and a radio access network corresponds to the radio access network 103 in FIG. 1. In these method procedures, it is assumed that a guarantee notification switch status of QoS of a guaranteed data service changes.

Figure 6A:
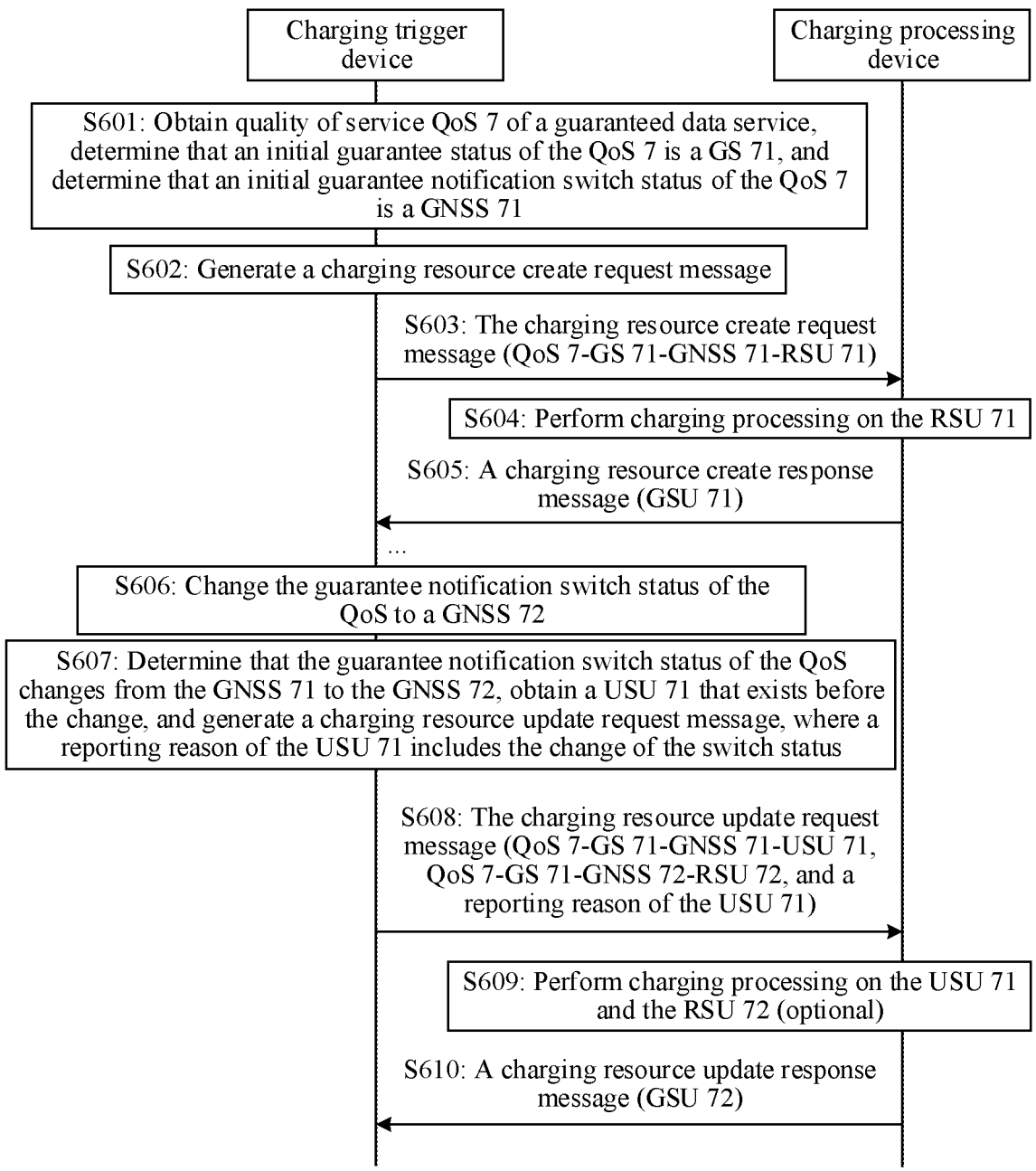
FIG. 6A to FIG. 6D are flowcharts of a ninth method to a twelfth method for performing charging processing on a guaranteed data service according to an embodiment of this disclosure.

In the method procedure shown in FIG. 6A, a charging mode of the guaranteed data service is online charging, and when determining that the guarantee notification switch status of the QoS changes, the charging trigger device immediately reports charging data that exists before the change and charging data that exists after the change. The method procedure mainly includes the following steps.

Step 601: The charging trigger device obtains a quality of service QoS 7 of a guaranteed data service, determines that a guarantee status of the QoS 7 is a GS 71, and determines that a guarantee notification switch status of the QoS 7 is a GNSS 71 (relatively referred to as a first switch status).

Specifically, the charging processing device obtains, according to a locally configured PCC rule or a PCC rule delivered by a policy control device, the quality of service QoS 7 of the guaranteed data service. For example, the quality of service is: "a guaranteed bandwidth is 10 M". The charging trigger device determines that the guarantee status of the QoS 7 is the GS 71, for example, "guaranteed", and determines that the guarantee notification switch status of the QoS 7 is the GNSS 71, for example, "on", where "on" means that the charging trigger device has sent a request message to the RAN, to request the RAN to notify the charging trigger device of the guarantee status of the QoS 7.

Step 602: The charging trigger device generates a charging resource create request message.

Specifically, based on a service requirement, the charging trigger device generates the charging resource create request message for the guaranteed data service, where the charging resource create request message may include the QoS 7, the GS 71, and a requested quota RSU 71 that is of the guaranteed data service and that corresponds to the QoS 7 and the GS 71.

Step 603: The charging trigger device sends the charging resource create request message to the charging processing device, where the request message includes QoS 7-GS 71-GNSS 71-RSU 71.

Step 604: The charging processing device performs charging processing on the RSU 71.

Specifically, after receiving the charging request message, the charging processing device obtains QoS 7-GS 71-GNSS 71-RSU 71 through parsing the charging request message, and further performs charging processing on the RSU 71 based on the QoS 7, the GS 71, and the GNSS 71, for example, performs rating and grants a corresponding quota GSU 71 based on the QoS 7, the GS 71, and the GNSS 71.

Step 605: The charging processing device sends a charging resource create response message to the charging trigger device, where the charging resource create response message includes the GSU 71.

Specifically, the charging processing device generates the charging resource create response message and sends the charging resource create response message to the charging trigger device, where the charging resource create response message includes a charging resource identifier, the GSU 71, and the like. Subsequently, the charging trigger device may allow the guaranteed data service based on the GSU 71.

Step 606: The charging trigger device changes the guarantee notification switch status of the QoS to a GNSS 72 (relatively referred to as a second switch status).

Specifically, the charging trigger device may change the guarantee notification switch status of the QoS 7 to the GNSS 72 according to a PCC rule or a control instruction delivered by the policy control device. This means that the charging trigger device may have sent a request message to the radio access network, to request the radio access network to notify a real guarantee status of the QoS 7 to the charging trigger device or cancel notifying a real guarantee status of the QoS 7 to the charging trigger device. This depends on an actual value (for example, "on" or "off") of the GNSS 72.

Step 607: The charging trigger device determines that the guarantee notification switch status of the QoS changes from the GNSS 71 to the GNSS 72, obtains USU 71 that exists before the change, and generates a charging resource update request message, where a reporting reason of the USU 71 includes the change of the switch status.

Specifically, the charging trigger device determines, based on a change result in step 606, that the guarantee notification switch status of the QoS 7 changes. If a QoS 7-based guarantee notification switch status trigger on the charging trigger device has been activated, and a reporting type is set to immediate reporting, the charging trigger device obtains the usage data USU 71 that exists before the change, and generates the charging resource update request message based on the usage data, where the message includes QoS 7-GS 71-USU 71-GNSS 71 and the reporting reason of the USU 71. The reporting reason indicates that the USU 71 is sent to the charging processing device because the guarantee notification switch status of the QoS changes. Optionally, the message may further include QoS 7-GS 71-GNSS 72-RSU 72, where the RSU 72 is a requested quota that is of the guaranteed data service and that corresponds to the QoS 7 and the GS 71.

Step 608: The charging trigger device sends the charging resource update request message to the charging processing device, where the message includes QoS 7-GS 71-GNSS 71-USU 71, QoS 7-GS 71-GNSS 72-RSU 72, and the reporting reason of the USU 71.

Step 609: The charging processing device performs charging processing on the USU 71 and the RSU 72 (optional).

Specifically, the charging processing device may perform rating on the USU 71 and perform deduction on a user account based on the QoS 7, the GS 71, and the GNSS 71. A quota granted based on the QoS 7, the GS 71, and the GNSS 72 is GSU 72.

Step 610: The charging processing device sends a charging resource update response message to the charging trigger device, where the response message includes the GSU 72.

Figure 6B:
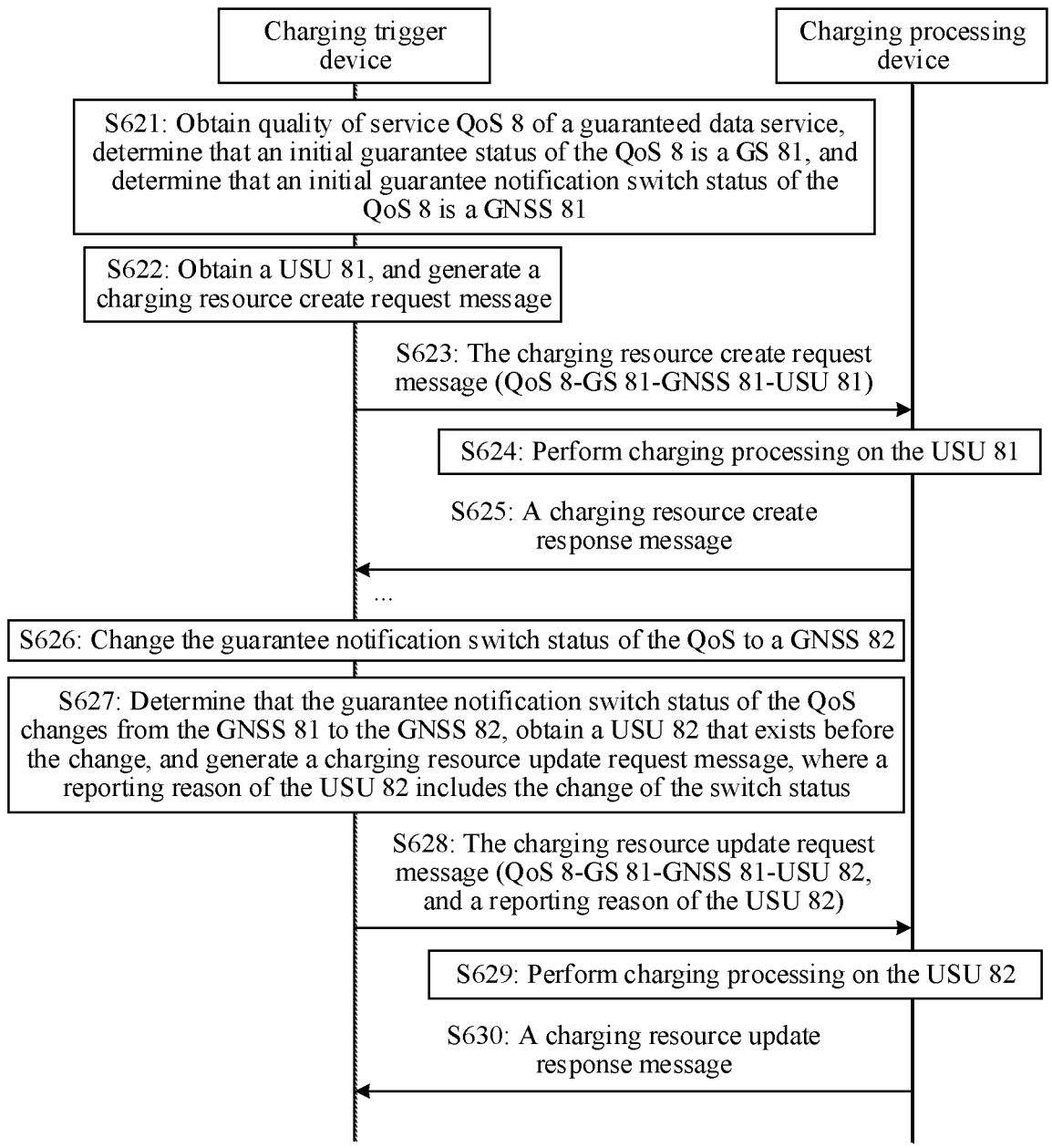

In the method procedure shown in FIG. 6B, a charging mode of the guaranteed data service is offline charging, and when determining that the guarantee notification switch status of the QoS changes, the charging trigger device immediately reports charging data that exists before the change and charging data that exists after the change. The method procedure mainly includes the following steps.

Step 621: The charging trigger device obtains a quality of service QoS 8 of a guaranteed data service, determines that a guarantee status of the QoS 8 is a GS 81, and determines that a guarantee notification switch status of the QoS 8 is a GNSS 81 (relatively referred to as a first switch status).

This step is similar to step 601, and details are not described again.

Step 622: The charging trigger device obtains a USU 81 and generates a charging resource create request message.

Specifically, the charging trigger device obtains the usage data USU 81 (relatively referred to as second usage data) of the guaranteed data service, and generates the charging resource create request message, where the message includes QoS 8-GS 81-GNSS 81-USU 81.

Step 623: The charging trigger device sends the charging resource create request message to the charging processing device, where the request message includes QoS 8-GS 81-GNSS 81-USU 81.

Step 624: The charging processing device performs charging processing on the USU 81.

For this step, refer to the charging processing performed on the USU 71 in step 609. Details are not described again.

Step 625: The charging processing device sends a charging resource create response message to the charging trigger device.

The charging resource create response message may include a charging resource identifier.

Step 626: The charging trigger device changes the guarantee notification switch status of the QoS to a GNSS 82 (relatively referred to as a second switch status).

This step is similar to step 606, and details are not described again.

Step 627: The charging trigger device determines that the guarantee notification switch status of the QoS changes from the GNSS 81 to the GNSS 82, obtains the USU 82 that exists before the change, and generates a charging resource update request message, where a reporting reason of the USU 82 includes the change of the switch status.

Specifically, the charging trigger device determines, based on a change result in step 626, that the guarantee notification switch status of the QoS 8 changes. If a QoS 8-based guarantee notification switch status trigger on the charging trigger device has been activated, and a reporting type is immediate reporting, the charging trigger device obtains the usage data USU 82 that exists before the change, and generates the charging resource update request message based on the data, where the message includes QoS 8-GS 81-USU 82-GNSS 82 and the reporting reason of the USU 82. The reporting reason indicates that the USU 82 is sent to the charging processing device because the guarantee notification switch status of the QoS changes.

Step 628: The charging trigger device sends the charging resource update request message to the charging processing device, where the message includes QoS 8-GS 81-GNSS 81-USU 82 and the reporting reason of the USU 82.

Step 629: The charging processing device performs charging processing on the USU 82.

For this step, refer to the charging processing performed on the USU 71 in step 609.

Step 630: The charging processing device sends a charging resource update response message to the charging trigger device.

In the method procedures corresponding to FIG. 6A and FIG. 6B, when the guarantee notification switch status of the QoS changes, the charging processing device may still perform charging "based on the guarantee status", to avoid a charging error. In addition, the immediate reporting mechanism ensures that the change of the guarantee notification switch status is reflected in a charging processing result in a more timely manner, and this helps improve user experience.

Figure 6C:
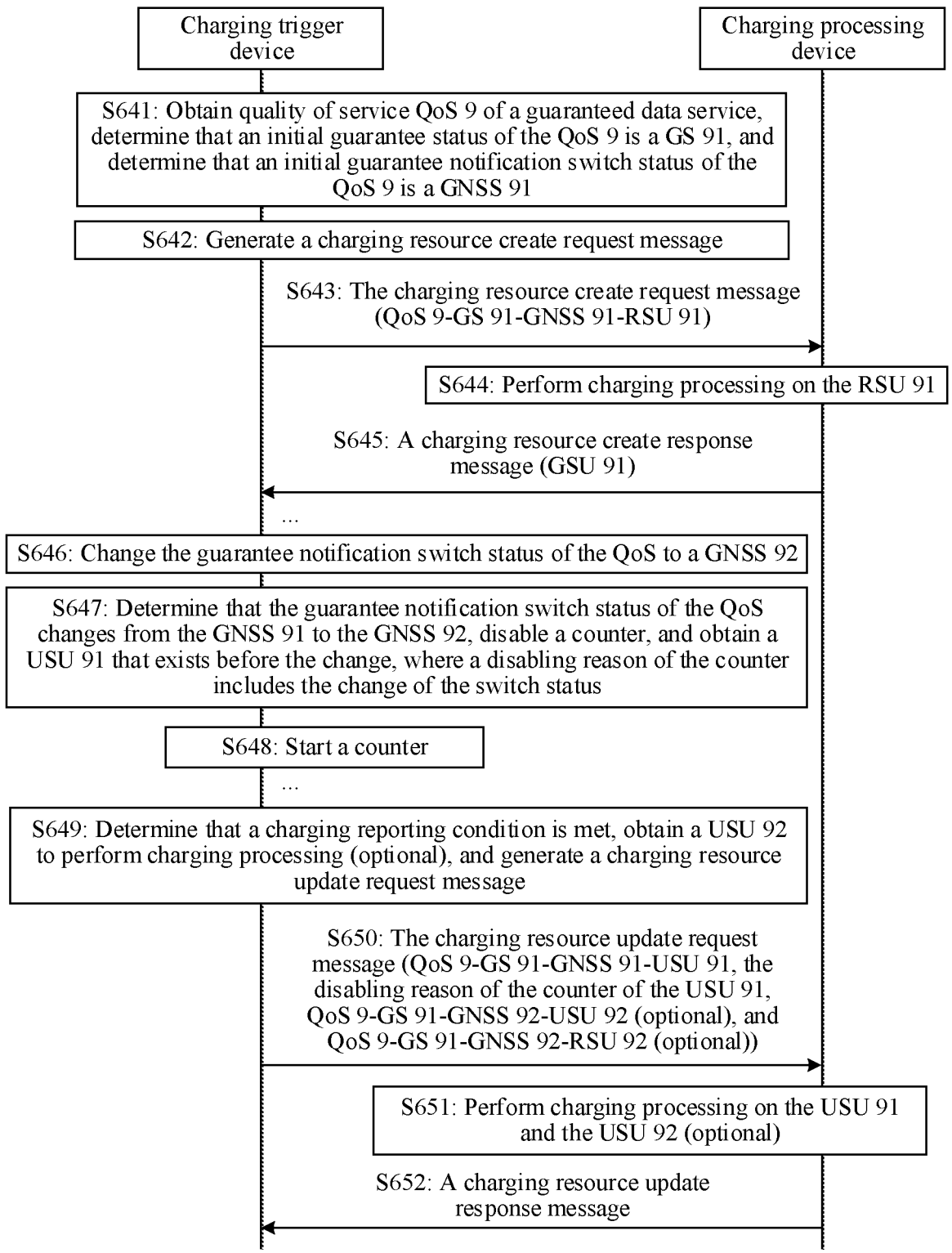

In the method procedure shown in FIG. 6C, a charging mode of the guaranteed data service is online charging, and when determining that the guarantee notification switch status of the QoS changes, the charging trigger device defers reporting of charging data that exists before the change. The method procedure mainly includes the following steps.

Step 641 to step 646 are similar to step 601 to step 606, and details are not described again.

Step 647: The charging trigger device determines that the guarantee notification switch status of the QoS changes from the GNSS 91 to the GNSS 92, disables a counter, and obtains a USU 91 that exists before the change, where a disabling reason includes the change of the switch status.

Specifically, the charging trigger device determines, based on a change result in step 646, that the guarantee notification switch status of the QoS 9 changes. If a QoS 9-based guarantee notification switch status trigger on the charging trigger device has been activated, and a reporting type of the trigger is deferred reporting, the charging trigger device obtains the usage data USU 91 that exists before the change, and does not generate a charging resource update request message temporarily, but stores the USU 91 and the disabling reason of the counter of the USU 91. The disabling reason indicates that the counter is disabled because the guarantee notification switch status of the QoS changes. In this way, when a first charging reporting condition is met after the guarantee notification switch status changes, the charging trigger device may report the stored USU 91 and the stored disabling reason of the counter to the charging processing device by using a charging request message.

Step 648: The charging trigger device starts a counter.

Specifically, the charging trigger device starts the new counter at the same time as step 647 or after step 647, to collect subsequent usage of the guaranteed data service.

Step 649: The charging processing device determines that a charging reporting condition is met, obtains USU 92 (relatively referred to as first usage data) (optional), and generates a charging resource update request message.

Specifically, if the charging trigger device determines that a charging reporting condition of the guaranteed data service is met, or a charging reporting condition of another data service (for example, a data service other than the guaranteed data service) is met, the charging trigger device obtains the stored USU 91 and the stored disabling reason of the counter of the USU 91, and generates the charging resource update request message.

If the charging reporting condition of the another data service is met, the charging resource update request message may include QoS 9-GS 91-GNSS 91-USU 91, the disabling reason of the counter of the USU 91, and QoS 9-GS 91-GNSS 92-RSU 92. The RSU 92 is a requested quota that is of the guaranteed data service and that corresponds to the QoS 9, the GS 91, and the GNSS 92.

If the charging reporting condition of the guaranteed data service is met, in addition to QoS 9-GS 91-GNSS 91-USU 91 and the disabling reason of the counter of the USU 91, the charging resource update request message may further include QoS 9-GS 91-GNSS 92-USU 92 and QoS 9-GS 91-GNSS 92-RSU 92. The USU 92 (relatively referred to as second usage data) is usage data that exists between a time point at which the guarantee status changes and a time point at which the charging reporting condition of the guaranteed data service is met. The RSU 92 is a requested quota that is of the guaranteed data service and that corresponds to the QoS 9, the GS 91, and the GNSS 92. Therefore, in this case, the charging trigger device further obtains the USU 92.

Step 650: The charging trigger device sends the charging resource update request message to the charging processing device, where the request message includes QoS 9-GS 91-GNSS 91-USU 91, the disabling reason of the counter of the USU 91 (optional), QoS 9-GS 91-GNSS 92-RSU 92 (optional), and QoS 9-GS 91-GNSS 92-USU 92 (optional).

Step 651: The charging processing device performs charging processing on the USU 91 and the USU 92 (optional).

The charging processing device receives and parses the charging resource update request message, and performs the following steps:

If the charging request message includes QoS 9-GS 91-GNSS 91-USU 91, the charging processing device performs charging on the USU 91 based on QoS 9-GS 91-GNSS 91. For charging processing on the usage data based on the QoS, the guarantee status of the QoS, and the guarantee notification switch status of the QoS, refer to step 609. Details are not described again.

If the charging resource update request message includes QoS 9-GS 91-GNSS 92-USU 92, the charging processing device performs charging processing on the USU 92 based on QoS 9-GS 91-GNSS 92.

If the charging request message includes QoS 9-GS 91-GNSS 92-RSU 92, the charging processing device performs charging on the RSU 92 based on QoS 9-GS 91-GNSS 92, to obtain a granted quota GSU 92. For charging processing on the requested quota based on the QoS, the guarantee status of the QoS, and the guarantee notification switch status of the QoS, refer to step 609. Details are not described again.

If the charging request message includes the disabling reason of the counter of the USU 91, the charging trigger device may determine, based on the reason, that the guarantee status of the QoS of the guaranteed data service changes.

Step 652: The charging processing device sends a charging resource update response message to the charging trigger device, where the response message includes the GSU 92.

Figure 6D:
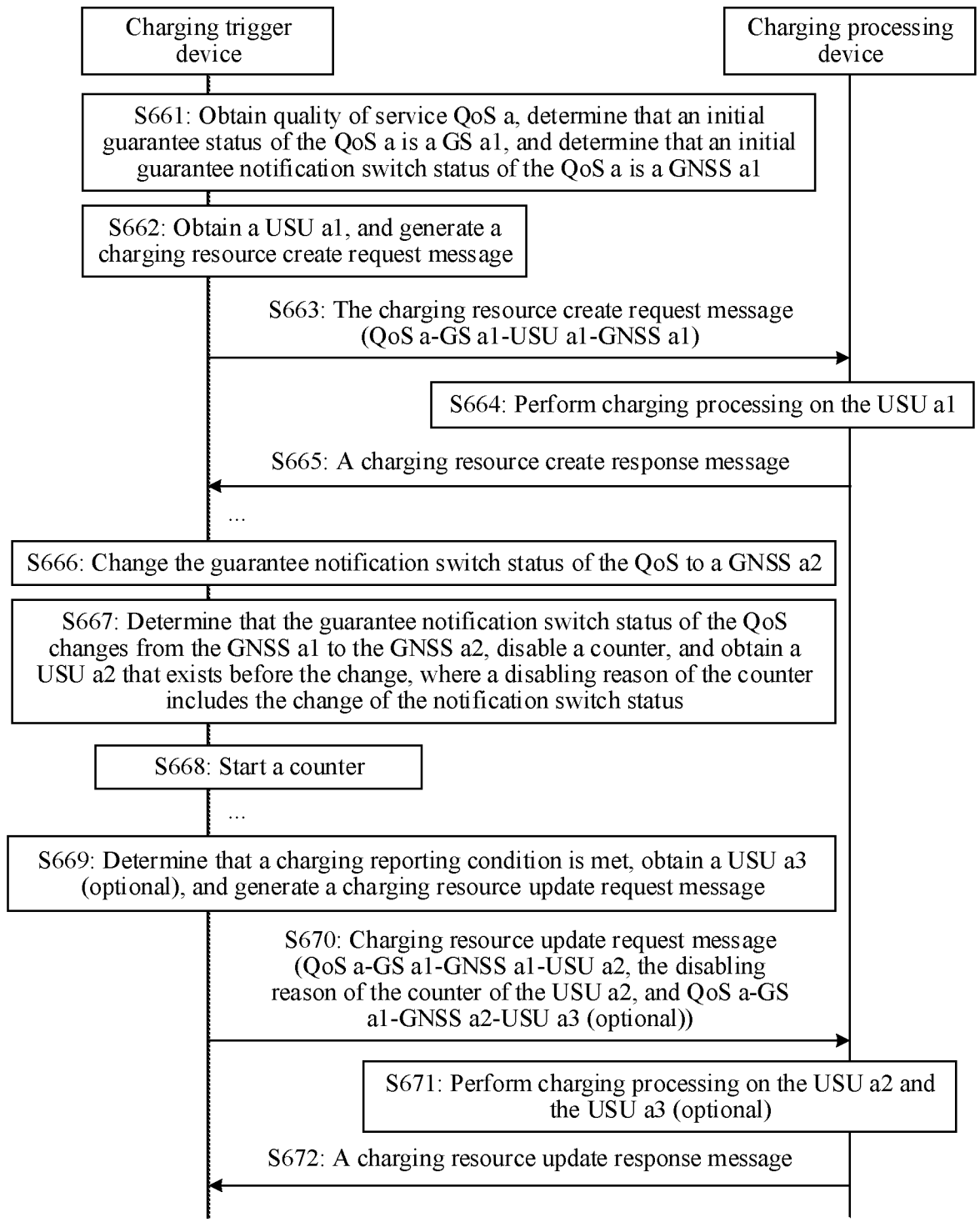

In the method procedure shown in FIG. 6D, a charging mode of the guaranteed data service is offline charging, and when determining that the guarantee notification switch status of the QoS changes, the charging trigger device defers reporting of charging data that exists before the change. The method procedure mainly includes the following steps.

Step 661 to step 666 are similar to step 641 to step 646, and details are not described again.

Step 667: The charging trigger device determines that the guarantee notification switch status of the QoS changes from the GNSS a1 to the GNSS a2, disables a counter, obtains the USU a2 that exists before the change, and generates a charging resource update request message, where a disabling reason of the counter includes the change of the guarantee notification switch status of the QoS.

Specifically, the charging trigger device determines, based on a change result in step 666, that the guarantee status of the QoS a changes. If a QoS a-based guarantee notification switch status trigger on the charging trigger device has been activated, and a reporting type of the trigger is deferred reporting, the charging trigger device obtains the usage data USU a2 that exists before the change, and does not generate a charging resource update request message temporarily, but stores the USU a2 and the disabling reason of the counter of the USU a2. The disabling reason indicates that the counter is disabled because the guarantee notification switch status of the QoS changes. In this way, when a first charging reporting condition is met after the guarantee notification switch status changes, the charging trigger device may report the stored USU a2 and the stored disabling reason of the counter to the charging processing device by using a charging request message.

Step 668: The charging trigger device starts a counter.

Specifically, the charging trigger device starts the new counter at the same time as step 667 or after step 667, to collect subsequent usage of the guaranteed data service.

Step 669: The charging processing device determines that a charging reporting condition is met, obtains a USU a3 (optional), and generates a charging resource update request message.

Specifically, if the charging trigger device determines that a charging reporting condition of the guaranteed data service is met, or a charging reporting condition of another data service (for example, a data service other than the guaranteed data service in a same PDU session) is met, the charging trigger device obtains the stored USU a2 and the stored disabling reason of the counter of the USU a2, and generates the charging resource update request message.

If a charging reporting condition of another data service is met, the charging resource update request message may include QoS a-GS a1-GNSS a1-USU a2 and the disabling reason of the counter of the USU a2.

If the charging reporting condition of the guaranteed data service is met, in addition to QoS a-GS a1-GNSS a1-USU a2 and the disabling reason of the counter of the USU a2, the charging resource update request message may further include QoS a-GS a1-GNSS a2-USU a3. The USU a3 is usage data that exists between a time point at which the guarantee notification switch status changes and a time point at which the charging reporting condition of the guaranteed data service is met. Therefore, in this case, the charging trigger device further obtains the USU a3.

Step 670: The charging trigger device sends the charging resource update request message to the charging processing device, where the request message includes QoS a-GS a1-USU a2-GNSS a1, the disabling reason of the counter of the USU a2, and QoS a-GS a1-USU a3-GNSS a2 (optional).

Step 671: The charging processing device performs charging processing on the USU a2 and the USU a3 (optional).

For this step, refer to the charging processing performed on the USU 71 in step 609. Details are not described again.

Step 672: The charging processing device sends a charging resource update response message to the charging trigger device.

In the method procedures corresponding to FIG. 6C and FIG. 6D, the charging processing device may still perform charging "based on the guarantee status" when the guarantee notification switch status of the QoS changes, and the deferred reporting mechanism not only can implement more flexible charging for a user, but also can reduce interactions between the charging trigger device and the charging processing device and reduce pressure on a gateway and the charging processing device.

It should be understood that, in the foregoing method procedures shown in FIG. 3A and FIG. 3B, FIG. 4, FIG. 5A to FIG. 5D, and FIG. 6A to FIG. 6D, a charging resource create request message, such as the charging resource create request message in steps 302/303/304, 402/403/404, 502/503/504, and 602/603/604, may be replaced with a charging resource update request message. Correspondingly, a corresponding charging resource create response message in subsequent steps may also be replaced with a charging resource update response message. A charging resource update request message, such as the charging resource update request message in steps 306/307/308, 402/403/404, 507/508/509, and 607/608/609, may be replaced with a charging resource delete request message. Correspondingly, a corresponding charging resource update response message in subsequent steps may also be replaced by a charging resource delete response message.

Figure 7:
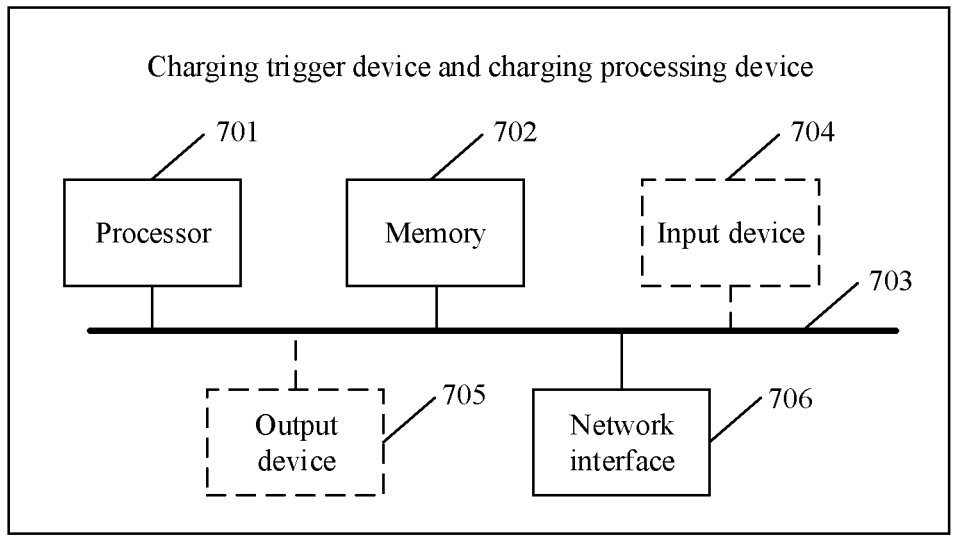
FIG. 7 is a structural diagram of hardware of a charging trigger device or a charging processing device according to an embodiment of this disclosure.

FIG. 7 is a structural diagram of hardware of a charging trigger device or a charging processing device according to an embodiment of this disclosure. All charging trigger devices (for example, the charging trigger device 102 in FIG. 1) and all charging processing devices (for example, the charging processing device 101 in FIG. 1) in the embodiments of this disclosure may use general computer hardware shown in FIG. 7. The general computer hardware includes a processor 701, a memory 702, a bus 703, an input device 704, an output device 705, and a network interface 706. The input device 704 and the output device 705 are optional.

Specifically, the memory 702 may include a computer storage medium in a form of a volatile and/or nonvolatile memory, such as a read-only memory and/or a random access memory. The memory 702 can store an operating system, an application program, another program module, executable code, and program data.

The input device 704 may be configured to input information, so that a system administrator operates and manages the charging trigger device or the charging processing device, for example, configures a fault processing policy on the charging processing device. The input device 704 may be a keyboard or a pointing device, for example, a mouse, a trackball, a touchpad, a microphone, a joystick, a game pad, a satellite TV antenna, a scanner, or a similar device. These input devices may be connected to the processor 701 by using the bus 703.

The output device 705 may be configured to output information, so that the system administrator operates and manages the charging trigger device or the charging processing device. The output device 705 may be a monitor, or another peripheral output device, for example, a speaker and/or a print device. The output device may also be connected to the processor 701 through the bus 703.

The charging trigger device or the charging processing device may access a network, for example, a local area network (LAN) through the network interface 706. In a network access environment, a computer-executable instruction stored in the device is not limited to being locally stored, but may be stored in a remote storage device.

For the charging trigger device, when the processor 701 executes the executable code or the application program stored in the memory 702, the charging trigger device may perform the method steps corresponding to the charging trigger device in all the foregoing embodiments, for example, steps 201, 302, 307, 401, 501, and 601. For a specific execution process, refer to the foregoing embodiments. Details are not described herein again.

For the charging processing device, when the processor 701 executes the executable code or the application program stored in the memory 702, the charging processing device may perform the method steps corresponding to the charging processing device in all the foregoing embodiments, for example, steps 203, 304, 358, 404, 504, and 604. For a specific execution process, refer to the foregoing embodiments. Details are not described herein again.

Figure 8:
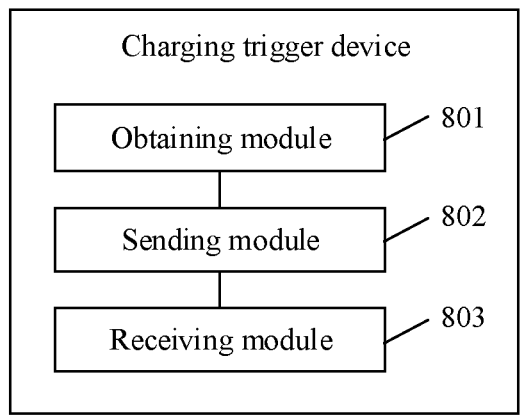
FIG. 8 is a schematic structural diagram of a charging trigger device according to an embodiment of this disclosure.

FIG. 8 is a schematic structural diagram of a charging trigger device according to an embodiment of this disclosure. The charging trigger device is configured to perform charging processing on a guaranteed data service of a user. The charging trigger device includes an obtaining module 801, a sending module 802, and a receiving module 803.

The obtaining module 801 is configured to obtain usage data of the guaranteed data service, a quality of service QoS that is of the guaranteed data service and that corresponds to the usage data, and a guarantee status GS of the QoS, and the like. For a specific execution process, refer to step description on a charging trigger device side in the foregoing embodiments, for example, step 201.

The sending module 802 is configured to send a first charging request message to a charging processing device, where the first charging request message includes the usage data, the QoS, the GS, and the like. For a specific execution process, refer to step descriptions on the charging trigger device side in the foregoing embodiments, for example, steps 202, 303, and 403.

The receiving module 803 is configured to receive a first charging response message from the charging processing device, where the first charging response message includes a charging processing result of the first charging request message. For a specific execution process, refer to step description on the charging trigger device side in the foregoing embodiments, for example, step 201.

In this embodiment, the charging trigger device is presented in a form of a function module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the charging trigger device may alternatively be in a form shown in FIG. 7. The obtaining module 801 and the sending module 802 may be implemented by using the processor 701 and the memory 702 in FIG. 7. For example, a function of obtaining, by the obtaining module 801, the usage data of the guaranteed data service, the quality of service QoS that is of the guaranteed data service and that corresponds to the usage data, and the guarantee status GS of the QoS may be implemented by the processor 701 executing the code stored in the memory 702.

Figure 9:
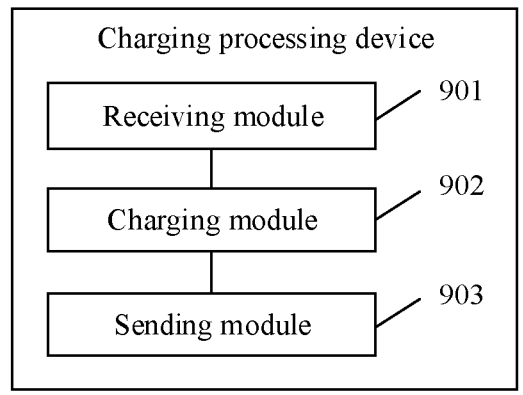
FIG. 9 is a schematic structural diagram of a charging processing device according to an embodiment of this disclosure.

FIG. 9 is a schematic structural diagram of a charging processing device according to an embodiment of this disclosure. The charging processing device includes a receiving module 901, a charging module 902, and a sending module 903.

The receiving module 901 is configured to receive a first charging request message from a charging trigger device, where the first charging request message includes usage data of the guaranteed data service, a quality of service QoS that is of the guaranteed data service and that corresponds to the usage data, a guarantee status GS of the QoS, and the like. For a specific execution process, refer to step descriptions on a charging processing device side in the foregoing embodiments, for example, steps 202, 203, 303, 304, 353, 354, 650, and 651.

The charging module 902 is configured to perform charging processing based on the first charging request message, where the charging processing includes processing the usage data based on the QoS and the GS. For a specific execution process, refer to step descriptions on the charging processing device side in the foregoing embodiments, for example, steps 203, 304, 354, 404, and 651.

The sending module 903 is configured to send a first charging response message from the charging trigger device, where the first charging response message includes a charging processing result of the first charging request message. For a specific execution process, refer to step description on the charging processing device side in the foregoing embodiments, for example, steps 204, 405, 630, and 652.

In this embodiment, the charging processing device is presented in a form of a function module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the charging processing device may alternatively be in a form shown in FIG. 7. The receiving module 901 and the charging module 902 may be implemented by using the processor 701 and the memory 702 in FIG. 7. For example, the function of performing charging processing by the charging module 902 based on the first charging request message may be implemented by the processor 701 by executing the code stored in the memory 702.

A person of ordinary skill in the art may be aware that, the units and steps in the examples described with reference to the embodiments disclosed herein may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the several embodiments provided in this disclosure, it should be understood that, the disclosed system, apparatus, and method may be implemented in another manner. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments of this disclosure.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions in this disclosure essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes any medium that can store program code, such as a removable hard disk, a read-only memory, a random access memory, a magnetic disk, or an optical disc.

The foregoing descriptions are merely specific implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for performing charging processing on a data service of a user, performed by a charging trigger device, comprising:
sending a charging request message to a charging processing device, wherein the charging request message comprises charging data of the data service, wherein the charging data comprises usage information of a quota or a quota request, the charging request message further indicating a guarantee status of a quality of service (QOS) that is of the data service and that corresponds to the charging data, the guarantee status of the QoS indicating whether the QoS is currently guaranteed or not in the access network; and receiving a charging response message from the charging processing device, wherein the charging response message comprises a charging processing result of the charging request message, wherein the charging processing result is based on the guarantee status of the QoS.

2. The method according to claim 1, wherein before the sending the charging request message to the charging processing device, the method further comprises:

setting a guarantee status trigger of the QoS and a reporting type for the guarantee status trigger, wherein:
the reporting type of the guarantee status trigger is set to immediate reporting, and the guarantee status trigger causes the charging trigger device to send, to the charging processing device when the guarantee status of the QoS changes, usage data that is of the guaranteed data service and that exists before the change; or the reporting type of the guarantee status trigger is set to deferred reporting, and the guarantee status trigger causes the charging trigger device to store, when the guarantee status of the QoS changes, usage data that is of the guaranteed data service and that exists before the change, and then report the stored usage data by having the stored usage data carried in a charging request message sent to the charging processing device after the change.

3. The method according to claim 2, wherein the reporting type of the guarantee status trigger is set to immediate reporting, and the sending the charging request message to the charging processing device is performed when the guarantee status of the QoS changes from a first guarantee status to a second guarantee status, and wherein the charging data in the charging request message comprises first usage data of the data service under the first guarantee status, the guarantee status in the charging request message is the first guarantee status, the charging request message further comprises a reporting reason of the first usage data, and the reporting reason indicates that the first usage data is sent to the charging processing device because the guarantee status of the QOS changes.

4. The method according to claim 2, wherein the reporting type of the guarantee status trigger is set to deferred reporting, and the sending the charging request message to the charging processing device comprises:

when the guarantee status of the QoS changes from a first guarantee status to a second guarantee status, storing first usage data of the data service under the first guarantee status, the first guarantee status, and a disabling reason of a counter of the first usage data, wherein the disabling reason indicates that the counter of the first usage data is disabled because the guarantee status of the QoS changed; and when a charging reporting condition is met, sending the charging request message to the charging processing device, wherein the charging data in the charging request message is the stored first usage data, the guarantee status in the charging request message is the stored first guarantee status, and the charging request message further comprises the stored disabling reason.

5. The method according to claim 1, further comprising:
determining, based on a notification received from a radio access network, that the guarantee status of the QoS changes from a first guarantee status to a second guarantee status.

6. The method according to claim 2, wherein the method further comprises:

receiving an operation instruction of the guarantee status trigger from the charging processing device; and setting the reporting type of the guarantee status trigger or setting an activation status of the guarantee status trigger based on the operation instruction of the guarantee status trigger.

7. The method according to claim 1, wherein before the sending the charging request message to the charging processing device, the method further comprises:

setting a guarantee notification switch status trigger of the QoS and a reporting type for the guarantee notification switch status trigger, wherein a reporting type of the guarantee notification switch status trigger is set to immediate reporting, and the guarantee notification switch status trigger causes the charging trigger device to send, to the charging processing device when a guarantee notification switch status changes, usage data that is of the data service and that exists before the change; or a reporting type of the guarantee notification switch status trigger is set to deferred reporting, and the guarantee notification switch status trigger causes the charging trigger device to store, when a guarantee notification switch status changes, usage data that is of the data service and that exists before the change, and then report the stored usage data by having the stored usage data carried in a charging request message sent to the charging processing device after the change.

8. The method according to claim 7, wherein the reporting type of the guarantee notification switch status trigger is set to immediate reporting, and the sending the charging request message to the charging processing device is performed when a guarantee notification switch status of the QoS changes from a first switch status to a second switch status, wherein the charging data in the charging request message comprises first usage data of the data service under the first switch status, the charging request message further comprises the first switch status and a reporting reason of the first usage data, and the reporting reason indicates that the first usage data is sent to the charging processing device because the guarantee notification switch status of the QoS changed.

9. The method according to claim 7, wherein the reporting type of the guarantee notification switch status trigger is deferred reporting, and the sending the charging request message to the charging processing device comprises:

when the guarantee notification switch status of the QoS changes from a first switch status to a second switch status, storing first usage data of the data service under the first switch status, the first switch status, and a disabling reason of a counter of the first usage data, wherein the disabling reason indicates that the counter is disabled because the guarantee notification switch status of the QOS changes; and when a charging reporting condition is met, sending the charging request message to the charging processing device, wherein the charging data in the charging request message is the first usage data, and the charging request message further comprises the first switch status and the disabling reason of the counter of the first usage data.

10. The method according to claim 7, wherein the method further comprises:
  receiving an operation instruction of the guarantee notification switch status trigger from the charging processing device; and
  setting the reporting type of the guarantee notification switch status trigger or setting an activation status of the guarantee notification switch status trigger based on the operation instruction of the guarantee notification switch status trigger.

11. The method according to claim 7, wherein the method further comprises:
  sending the guarantee notification switch status of the QoS to the charging processing device.

12. The method according to claim 7, wherein the method further comprises:
  receiving an operation instruction of the guarantee notification switch of the QoS from the charging processing device; and
    the operation instruction of the guarantee notification switch instructs to turn on the guarantee notification switch and a current status of the guarantee notification switch is off, and the method further comprises requesting the radio access network to notify the guarantee status of the QoS to the charging trigger device; or
    the operation instruction of the guarantee notification switch instructs to turn off the guarantee notification switch and the guarantee notification switch can be turned off currently, and the method further comprises requesting the radio access network to cancel notifying the guarantee status of the QoS to the charging trigger device.

13. The method according to claim 1, wherein the method further comprises:
  sending a 5G QoS identifier (5QI) of the data service or a resource type of the data service to the charging processing device.

14. A method for performing charging processing on a data service of a user, performed by a charging processing device, comprising:
  receiving a charging request message from a charging trigger device, wherein the charging request message comprises charging data of the data service, wherein the charging data comprises usage information of a quota or a quota request, the charging request message further indicating a guarantee status of a quality of service (QOS) that is of the data service and that corresponds to the charging data, the guarantee status of the QoS indicating whether the QoS is currently guaranteed or not in the access network;
  performing charging processing based on the charging request message; and
  sending a charging response message to the charging trigger device, wherein the charging response message comprises a charging processing result of the charging request message, the charging processing result based on the guarantee status of the QoS.

15. The method according to claim 14, wherein the charging request message comprises a guarantee notification switch status of the QoS.

16. The method according to claim 14, wherein the performing charging processing based on the charging request message comprises:
  when a reporting type of a guarantee status trigger of the QoS or an activation status of the guarantee status trigger of the QoS is to be set, sending an operation instruction of the guarantee status trigger of the QOS to the charging trigger device, wherein the operation instruction instructs the charging trigger device to set the reporting type of the guarantee status trigger or the activation status of the guarantee status trigger.

17. The method according to claim 14, wherein the performing charging processing based on the charging request message further comprises:
  when a reporting type of a guarantee notification switch status trigger of the QoS or an activation status of the guarantee notification switch status trigger of the QoS is to be set, sending an operation instruction of the guarantee notification switch status trigger of the QoS to the charging trigger device, wherein the operation instruction instructs the charging trigger device to set the reporting type of the guarantee notification switch status trigger or the activation status of the guarantee notification switch status trigger.

18. The method according to claim 15, wherein the performing charging processing based on the guarantee notification switch status comprises:
  when the guarantee notification switch status of the QoS is off, including an operation instruction of the guarantee notification switch in the charging response message, wherein the operation instruction instructs the charging trigger device to turn on the guarantee notification switch;
  or
  when the guarantee notification switch status of the QoS is off, determining to treat charging data that is of the data service and that is received after the charging request message is received as charging data that exists when the guarantee status of the QoS is a non-guaranteed status, for charging processing.

19. The method according to claim 14, wherein the charging request message further comprises a 5G QOS identifier (5QI) of the data service or a resource type of the data service, and the performing charging processing based on the charging request message comprises:
  determining, based on the 5QI or the resource type, that a quality of service of the data service is to be guaranteed.

20. A charging system, configured to perform charging processing on a data service of a user, comprising a charging trigger device and a charging processing device, wherein
  the charging trigger device is configured to:
    send a charging request message to the charging processing device, wherein the charging request message comprises charging data of the data service, wherein the charging data comprises usage information of a quota or a quota request, the charging request message further indicating a guarantee status of a quality of service (QOS) that is of the data service and that corresponds to the charging data, the guarantee status of the QoS indicating whether the QoS is currently guaranteed or not in the access network; and
    receive a charging response message from the charging processing device, wherein the charging response message comprises a charging processing result of the charging request message, wherein the charging processing result is based on the guarantee status of the QoS; and
  the charging processing device is configured to:
    receive the charging request message from the charging trigger device;

perform charging processing based on the charging request message; and send the charging response message to the charging trigger device.

* * * * *